(12) United States Patent
Zhao et al.

(10) Patent No.: US 12,185,875 B2
(45) Date of Patent: Jan. 7, 2025

(54) FOOD PROCESSOR AND CUTTER SET MOUNTING STRUCTURE THEREOF, AND STIRRING CUP

(71) Applicant: GUANGDONG MIDEA CONSUMER ELECTRICS MANUFACTURING CO., LTD., Foshan (CN)

(72) Inventors: Shaokun Zhao, Foshan (CN); Yunxiang Liu, Foshan (CN); Yi Sun, Foshan (CN)

(73) Assignee: GUANGDONG MIDEA CONSUMER ELECTRICS MANUFACTURING CO., LTD., Foshan (CN)

( * ) Notice: Subject to any disclaimer, the term of this patent is extended or adjusted under 35 U.S.C. 154(b) by 209 days.

(21) Appl. No.: 17/773,024

(22) PCT Filed: Sep. 28, 2020

(86) PCT No.: PCT/CN2020/118281
§ 371 (c)(1),
(2) Date: Apr. 28, 2022

(87) PCT Pub. No.: WO2021/135453
PCT Pub. Date: Jul. 8, 2021

(65) Prior Publication Data
US 2022/0386820 A1    Dec. 8, 2022

(30) Foreign Application Priority Data

Dec. 30, 2019 (CN) .................. 201911390606.X
Dec. 30, 2019 (CN) .................. 201922429921.0

(51) Int. Cl.
*A47J 43/07* (2006.01)
*A47J 43/046* (2006.01)

(52) U.S. Cl.
CPC ......... *A47J 43/0722* (2013.01); *A47J 43/046* (2013.01)

(58) Field of Classification Search
CPC .. A47J 43/046; A47J 43/0465; A47J 43/0716; A47J 43/0761; A47J 43/0727; A47J 43/0722
See application file for complete search history.

(56) References Cited

U.S. PATENT DOCUMENTS

2021/0007557 A1* 1/2021 LePori .................. A47J 43/075

FOREIGN PATENT DOCUMENTS

CN    1316886 A  * 10/2001  .......... A47J 43/0716
CN    204016061 U    12/2014
(Continued)

OTHER PUBLICATIONS

ISR mailed Dec. 31, 2020 of PCT Application No. PCT/CN2020/116261.
(Continued)

*Primary Examiner* — Christopher L Templeton
*Assistant Examiner* — P Derek Pressley

(57) ABSTRACT

The present disclosure provided a food processor, a cutter set mounting structure and a stirring cup. The cutter set mounting structure includes: a container bottom, a mounting hole being provided in the container bottom; and a cutter holder mounted at the mounting hole and used for allowing a cutter of a food processor to be mounted, and the cutter holder is provided with an anti-disengagement part, an anti-disengagement matching part is arranged at the container bottom, and the anti-disengagement part matches the anti-disengagement matching part to limit the cutter holder from being disengaged from the mounting hole under the action of gravity. In the present disclosure, by means of the matching of the anti-disengagement part and the anti-disengagement (Continued)

matching part, the cutter holder can be prevented from being disengaged from the mounting hole under the action of gravity.

14 Claims, 14 Drawing Sheets

(56) References Cited

FOREIGN PATENT DOCUMENTS

| CN | 205697385 U | 11/2016 | | |
|---|---|---|---|---|
| CN | 205866650 U | 1/2017 | | |
| CN | 206560378 U | 10/2017 | | |
| CN | 208371655 U | 1/2019 | | |
| CN | 206510863 U | 2/2019 | | |
| CN | 208510861 U | 2/2019 | | |
| CN | 206851478 U | 3/2019 | | |
| CN | 210611937 U | 5/2020 | | |
| CN | 201143536 U | 9/2020 | | |
| CN | 211432537 U | 9/2020 | | |
| CN | 211432574 U | 9/2020 | | |
| DE | 1038727 B | * | 9/1958 | |
| DE | 102015201699 A1 | | 8/2016 | |
| EP | 567853 A1 | * | 11/1993 | ............ A47J 43/046 |
| EP | 2253256 A2 | | 11/2010 | |
| EP | 2462851 A1 | * | 6/2012 | ............ A47J 27/004 |
| WO | WO-2021012387 A1 | * | 1/2021 | .............. A47J 19/00 |

OTHER PUBLICATIONS

EESR received in EP Application No. 20909829.2; mailed Dec. 22, 2022.

First OA received in CN Application No. 201911390606.X; mailed Apr. 4, 2024.

* cited by examiner

FOOD PROCESSOR AND CUTTER SET MOUNTING STRUCTURE THEREOF, AND STIRRING CUP

CROSS-REFERENCES TO RELATED APPLICATIONS

The present disclosure is a national phase application of International Application No. PCT/CN2020/118281, filed on Sep. 28, 2020, which claims priority to Chinese Patent Application No. 201911390606.X and Chinese Patent Application No. 201922429921.0 filed with China National Intellectual Property Administration on Dec. 30, 2019, the entireties of which are herein incorporated by reference.

FIELD

The present disclosure relates to the technical field of domestic electric appliances, and in particular, to a cutter set mounting structure of a food processor, a stirring cup including the cutter set mounting structure, and a food processor includes the stirring cup.

BACKGROUND

At present, in food processors such as wall breaking machines on the market, the cutter set is fixed in such a manner that the cutter set passes through the bottom of the cup, and then a nut or screw structure similar to the nut is used to lock the passed-cutter set at the bottom of the cup. To disassemble the cutter set, it is needed to invert the mixing cup and loosen the lock nut. However, when the locking nut is loosened, the cutter holder can easily disengage from the bottom of the cup under the force of gravity to fall on the table or ground, damage the table, ground or damage the cutter set, and even injure the user.

SUMMARY

Embodiments of the present disclosure to provide a cutter set mounting structure of a food processor.

Another embodiment of the present disclosure is to provide a mixing cup that includes the above-mentioned cutter set mounting structure.

A further embodiment of the present disclosure is to provide a food processor including a mixing cup as described above.

According to one embodiment of the present disclosure, there is provided a cutter set mounting structure of a food processor including a container bottom, and the container bottom is provided with a mounting hole; a cutter holder mounted at the mounting hole for mounting a cutter of the food processor; and the cutter holder is provided with an anti-disengagement part, the container bottom is provided with an anti-disengagement matching part, and the anti-disengagement part matches with the anti-disengagement matching part for restraining the cutter holder from being disengaged from the mounting hole under the action of gravity.

An embodiment of the first aspect of the present disclosure provides a cutter set mounting structure for a food processor, and an anti-disengagement part is additionally provided on the cutter holder, and an anti-disengagement matching part is correspondingly additionally provided on the container bottom, and the cutter holder can be prevented from being disengaged from the mounting hole under the action of gravity by means of the matching between the anti-disengagement part and the anti-disengagement matching part. In other words, after releasing the fixed connection relationship between the cutter holder and the container bottom, the cutter holder does not naturally disengage from the mounting hole under the action of gravity without external force, and it is possible to effectively prevent the cutter set from being disengaged from the container bottom under the action of gravity on the table or the ground during the process of disassembling the cutter, thus causing damage to the table or the ground or causing damage to the cutter set or hitting the user, and improving the safety of the assembly and disassembly of the product. However, after releasing the fixed connection relationship between the cutter holder and the container bottom, it is only necessary to apply an external force to the cutter set and/or the container bottom to release the matching relationship between the anti-disengagement part and the anti-disengagement matching part, and the cutter holder can be disengaged from the mounting hole to achieve the disassembly of the cutter holder, which is convenient and quick.

According to one embodiment of a second aspect of the present disclosure, there is provided a mixing cup of a food processor including a cup adapted to receive a cutter; and a cutter set mounting structure according to an embodiment of the first aspect, and a container bottom is connected to a lower end of the cup, and the cutter is mounted on and rotatably connected to a cutter holder of the cutter set mounting structure.

According to one embodiment of a third aspect of the present disclosure, there is provided a food processor including a stirring cup according to an embodiment of the second aspect; and a base located below and connected to the mixing cup.

Additional embodiments of the present disclosure will be set forth in part in the description which follows, or may be learned by practice of the present disclosure.

BRIEF DESCRIPTION OF THE DRAWINGS

The above embodiments of the present disclosure will become apparent and readily appreciated from the following description of embodiment taken in conjunction with the accompanying drawings of which.

The corresponding relationship between the reference signs and the component names in FIGS. 1 to 27:

1 container bottom, 11 base, 111 mounting hole, 112 cup bottom cover, 1121 second insertion hole, 1122 mounting cavity, 1123 guide slope, 1124 step surface, 113 heating disc, 1131 first insertion hole, 1132 connecting column, 114 sidewall, 115 fixing member, 1151 fixing body, 1152 fixing hole, 1153 connecting part, 1154 second arc groove, 116 stop part, 117 inner cavity, 118 avoiding groove, 12 locking member, 121 locking groove, 1211 notch, 122 locking portion, 1221 fixing part, 1222 elastic part, 123 avoidance gap, 124 positioning part, 1241 mounting post, 1242 positioning hole, 125 rotating shaft, 126 mounting groove, 127 driving surface, 128 locking component, 13 disengagement-proof part, 14 elastic snap hook, 15 elastic snap spring, 16 positioning groove; 2 cutter holder, 21 anti-disengagement part, 22 locking protrusion, 23 clamping groove, 10 stud, 101 connecting upper part, 102 connecting lower part, 103 transition part, 1031 transition slope, 104 supporting part; 3 cutter, 31 cutter shaft, 32 coupling; 4 cup body; 5 base; 6 restraining mechanism, 61 restraining member, 611 engagement surface, 612 operating part, 613 engagement part, 62 restoring member, 63 cover; 7 locking engagement mechanism, 71 elastic member, 711 torsion spring, 7111 first torsion arm, 7112 second torsion arm; and 8 seal.

DETAILED DESCRIPTION OF THE DISCLOSURE

Embodiments of the present disclosure can be more clearly understood, the present disclosure will be described in further detail below with reference to the accompanying drawings and detailed description. It should be noted that the embodiments and features of the embodiments of the present disclosure may be combined with each other without conflict.

In the following description, numerous specific details are set forth in order to provide a thorough understanding of the present disclosure, however, the present disclosure may be practiced in other ways than those described herein, and therefore the scope of the present disclosure is not limited by the specific embodiments disclosed below.

A food processor and its cutter set mounting structure and mixing cup according to some embodiments of the present disclosure will now be described with reference to FIGS. 1-27.

An embodiment of a first aspect of the present disclosure provides a cutter set mounting structure of a food processor, including a container bottom 1 and a cutter holder 2.

Figure 1:
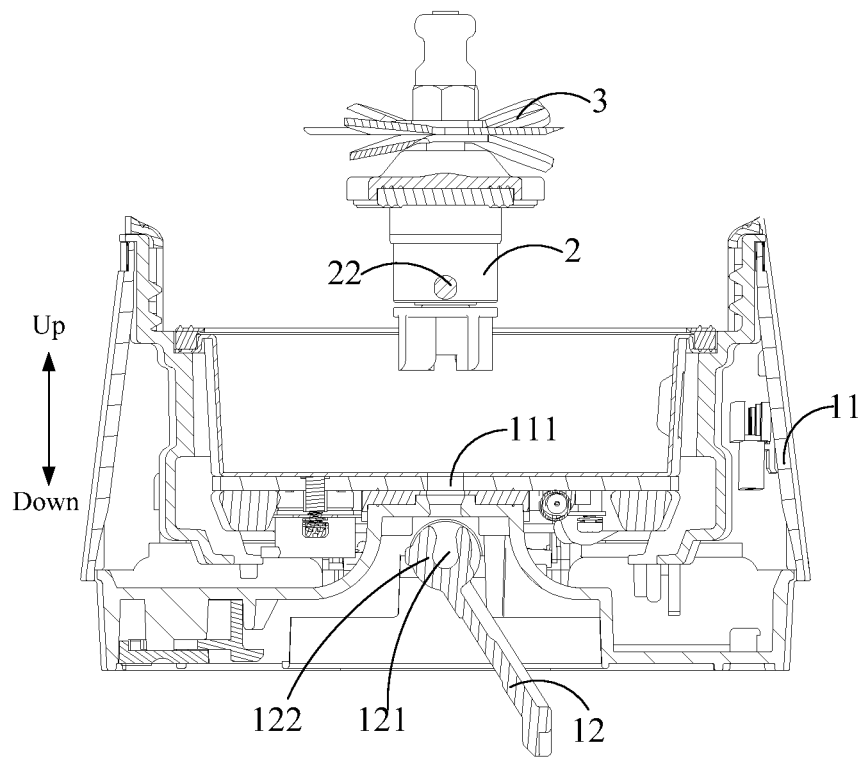
FIG. 1 is a schematic cross-sectional view of a first state of a cutter set mounting structure according to an embodiment of the present disclosure.
Figure 7:
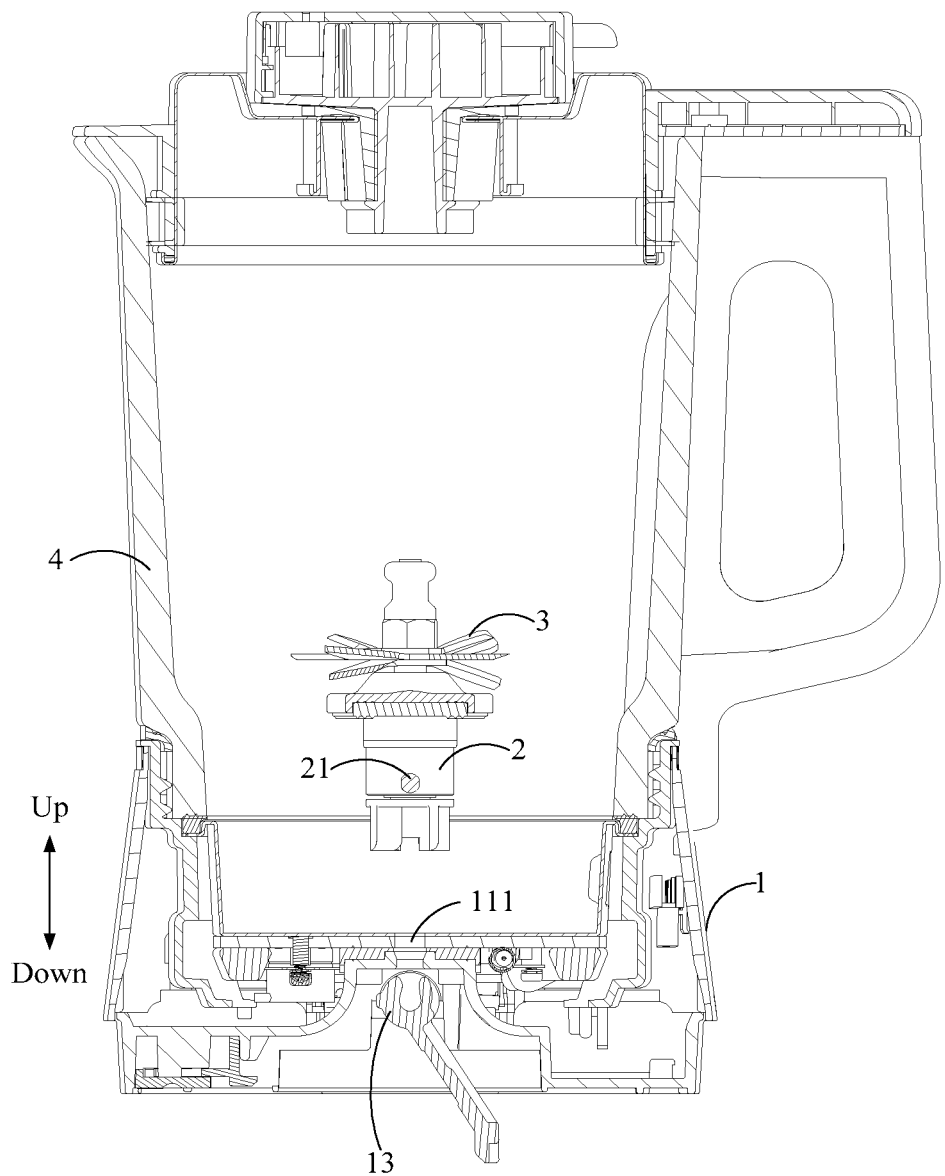
FIG. 7 is a schematic cross-sectional view of a first state of the mixing cup provided by one embodiment of the present disclosure.
Figure 12:
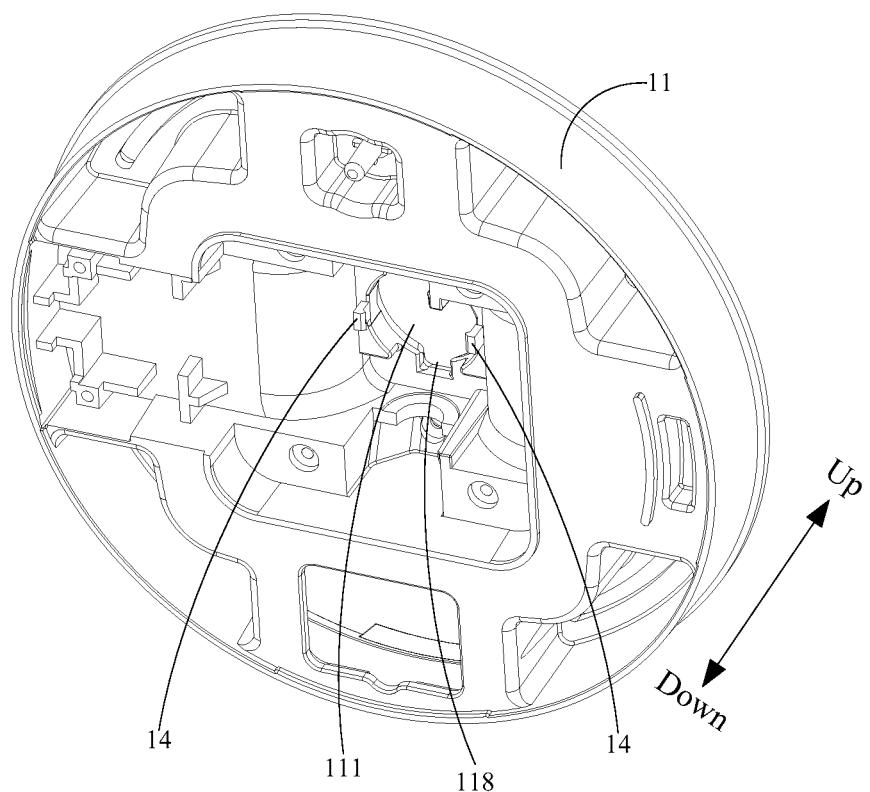
FIG. 12 is a perspective view of the base of FIG. 9.

In one embodiment, the container bottom 1 is provided with mounting holes 111, as shown in FIGS. 1, 7 and 12.

the cutter holder 2 is mounted at the mounting holes 111, as shown in FIGS. 2, 8, 9 and 13, for mounting the cutter 3 of the food processor.

In one embodiment, the cutter holder 2 is provided with an anti-disengagement part 21, and the container bottom 1 is provided with an anti-disengagement matching part 13, as shown in FIGS. 7, 8, 9 and 13. The anti-disengagement part 21 matches with the anti-disengagement matching part 13 to restrict the cutter holder 2 from being disengaged from the mounting holes 111 under the action of gravity.

An embodiment of the first aspect of the present disclosure provides a cutter set mounting structure for a food processor, and an anti-disengagement part 21 is additionally provided on the cutter holder 2, and an anti-disengagement matching part 13 is correspondingly additionally provided on the container bottom 1, and the cutter holder 2 can be prevented from being disengaged from the mounting holes 111 under the action of gravity by means of the matching between the anti-disengagement part 21 and the anti-disengagement matching part 13. In other words, after releasing the fixed connection relationship between the cutter holder 2 and the container bottom 1 (such as the lock nut is disassembled), the cutter holder 2 does not naturally disengage from the mounting holes 111 under the action of gravity without external force, and it is possible to effectively prevent the cutter set from being disengaged from the container bottom 1 under the action of gravity on the table or the ground during the process of disassembling the cutter, thus causing damage to the table or the ground or causing damage to the cutter set or hitting the user, and improving the safety of the assembly and disassembly of the product.

However, after releasing the fixed connection relationship between the cutter holder 2 and the container bottom 1, it is only necessary to apply an external force to the cutter set and/or the container bottom 1 to release the matching relationship between the anti-disengagement part 21 and the anti-disengagement matching part 13, and the cutter holder 2 can be disengaged from the mounting holes 111 to achieve the disassembly of the cutter holder 2, which is convenient and quick.

It is worth mentioning that the container bottom 1 can be the bottom of a stirring cup of a food processor, at this moment, the cup body 4 of the stirring cup is of a structure with two ends open, a base 5 is further provided below the stirring cup, and the base 5 and the stirring cup can be detachably fitted, and a sealing structure can be provided between the container bottom 1 and the lower end of the cup body 4 to ensure sealing performance, and the container bottom 1 can also be integrally connected to the cup body 4; or the bottom 1 of the container is the bottom of the stirring cup, the stirring cup includes a cup body 4 having an accommodating cavity, the bottom 1 of the container is located below the accommodating cavity, a structure such as a heating plate is provided between the bottom 1 of the container and the cup body 4, and at this time, the bottom 1 of the container can be connected to a sidewall of the cup body 4 via a sidewall plate, then from the perspective of appearance, the sidewall plate constitutes a part of the sidewall of the stirring cup, the bottom 1 of the container is the bottom of the stirring cup, and the sidewall plate and the bottom 1 of the container can be an integrated structure or a split-type structure; In one embodiment, the container bottom 1 can also be part of the base 5 of the food processor, in which case the stirring cup can be of a structure with an open upper end and a perforated bottom, the stirring cup being fixedly connected to the base 5 and being inseparable during use.

Some embodiments are described below with reference to the accompanying drawings.

Embodiment 1

Figure 2:
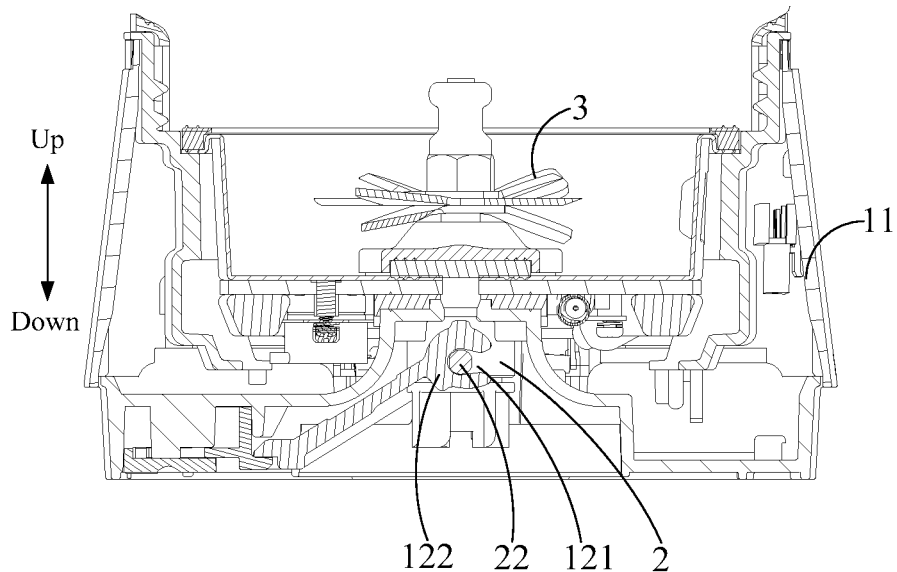
FIG. 2 is a schematic cross-sectional view of a second state of the cutter set mounting structure shown in FIG. 1.

The container bottom 1 includes: a base 11 and a locking component 12, as shown in FIGS. 1 and 2. In one embodiment, the base 11 is provided with mounting holes 111, as shown in FIG. 12. A locking component 12 is mounted on the base 11 and matches with the cutter holder 2 and is adapted to reciprocate relative to the base 11 between a cutter-disassembly position and a cutter-locking position and to lock the cutter holder 2 to secure the cutter holder 2 when moved to the cutter-locking position (as shown in FIG. 2) and to unlock the cutter holder 2 when moved to the cutter-disassembly position (as shown in FIG. 1).

The container bottom 1 includes a base 11 and a locking component 12, and the base 11 is provided with mounting holes 111, and the locking component 12 functions as a cutter for disassembling and mounting, and the cutter set can be mounted on and dismounted from the container bottom 1 by operating the locking component 12, which avoids the time-consuming and laborious situation caused by manual operation in the prior art and does not require additional use of other cutters for operation, and significantly reducing the difficulty for disassembling and mounting the cutter set and facilitating the quick disassembling and mounting of the cutter set.

At the same time, since the locking component 12 is directly mounted on the container bottom 1 and can reciprocate between a cutter-disassembly position and a cutter-locking position with respect to the container bottom 1, the locking component 12 will not be separated from the container bottom 1 during use, and the locking component 12 can be prevented from being lost or being confused with other cutters, and improving the reliability of use of the locking component 12, and also eliminating the need to re-assemble and position the locking component 12 each time the cutter set is disassembled, and improving the convenience of use of the locking component 12 and making the disassembly and assembly of the cutter set more labor-saving and convenient.

In addition, by locking or unlocking the cutter holder 2 using the locking component 12, the locking nut of the prior art is omitted, and in the case of a product in which the cutter 3 is rotated in one of the directions, it is possible to prevent the nut from being loosened and the cutter holder 2 from being loosened when the cutter 3 is rotated in one of the directions, and improving the use reliability of the product.

In one embodiment, the base 11 and/or the locking component 12 are provided with an anti-disengagement matching part 13.

Since both the base 11 and the locking component 12 have a matching relationship with the cutter holder 2, at least one of the base 11 and the locking component 12 is provided with an anti-disengagement matching part 13, which is mated with the anti-disengagement part 21 on the cutter holder 2, and the cutter holder 2 can be prevented from being disengaged from the mounting holes 111 under the action of gravity, and therefore this solution expands the setting range of the anti-disengagement matching part 13, to facilitate rational design according to needs in the actual production process to optimize the structure and performance of the product.

Figure 3:
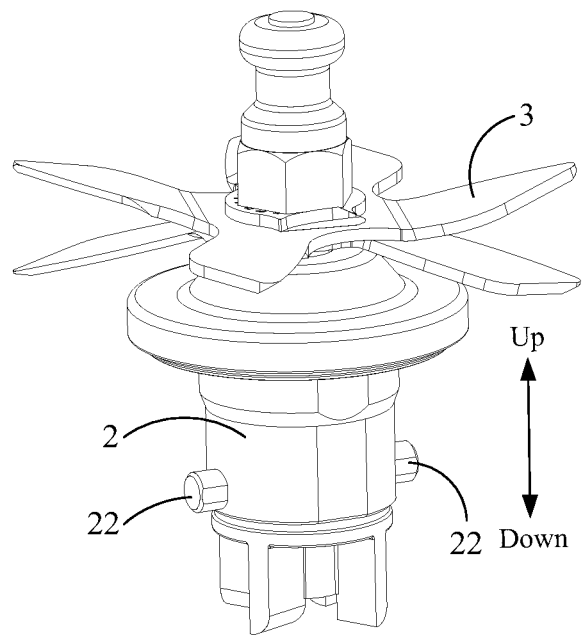
FIG. 3 is a schematic perspective view of the cutter set of FIGS. 1 and 2.
Figure 4:
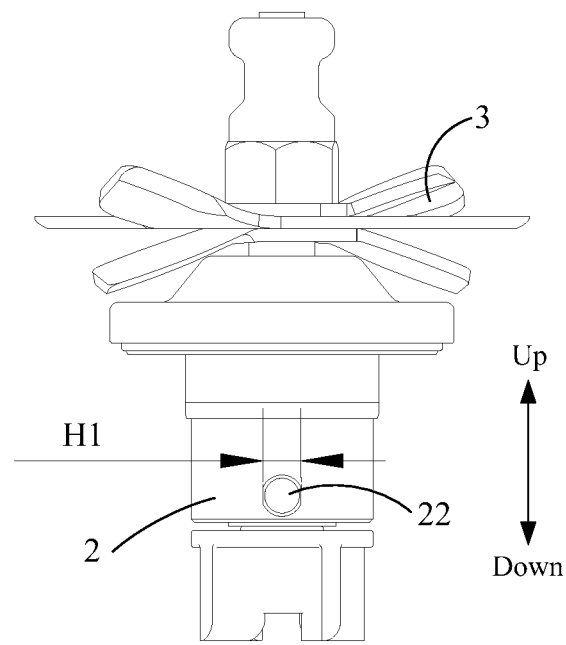
FIG. 4 is a schematic front view of the cutter set shown in FIG. 3.

Further, the locking component 12 is rotatably connected to the base 11, and the locking component 12 is provided with a locking groove 121, as shown in FIGS. 1, 2, 5 and 6. The wall surface of the cutter holder 2 is provided with a locking protrusion 22 (as shown in FIGS. 3 and 4), and the locking protrusion 22 is adapted to be engaged by inserting with the locking groove 121, as shown in FIG. 2.

The locking or unlocking of the cutter holder 2 by the locking component 12 is achieved by the matching of the locking protrusion 22 and the locking groove 121, and the structure and principle are relatively simple and easy to achieve.

In one embodiment, during the cutter-locking process, the locking component 12 is first rotated to the cutter-disassembly position, in which a notch 1211 of the locking groove 121 faces the entrance of the mounting holes 111 (i.e., faces the locking protrusion 22), and as shown in FIG. 1, the locking protrusion 22 can be inserted into the locking groove 121 via the notch 1211. Then, the locking component 12 is rotated to the cutter-locking position, as shown in FIG. 2, where the notch 1211 of the locking groove 121 is rotated to the other direction to prevent the locking protrusion 22 from being disengaged from the locking groove 121, and locking the cutter holder 2. At the same time, in the process of locking the cutter, the anti-disengagement part 21 of the cutter holder 2 matches with the anti-disengagement matching part 13 of the container bottom 1 to play a restraining role on the cutter holder 2, and can prevent the cutter holder 2 from being disengaged from the mounting holes 111 under the action of gravity.

On the other hand, in the process of disassembling the cutter, the locking component 12 is firstly rotated from the cutter-locking position to the cutter-disassembly position, at this time, the notch 1211 of the locking groove 121 faces the inlet and outlet of the mounting holes 111, and in the absence of an external force, the cutter holder 2 is kept stationary due to the restriction of the anti-disengagement part 21 and the anti-disengagement matching part 13, and an external force is applied to the cutter holder 2 or the container bottom 1 or to the cutter holder 2 and the container bottom 1 at the same time to release the engagement of the anti-disengagement part 21 and the anti-disengagement matching part 13, i.e., the cutter holder 2 can be pulled out of the mounting holes 111 to achieve the disassembly of the cutter holder 2.

In the cutter-disassembly process and cutter-locking process, in order to facilitate the operation of the locking component 12, the base 11 can be inverted up and down, and if there is no restriction of the anti-disengagement part 21 and the anti-disengagement matching part 13, the cutter set can easily drop directly off the container bottom 1 under the action of gravity, while in this solution, since there is a matching of the anti-disengagement part 21 and the anti-disengagement restraining part, the user can be assured of the operation.

Of course, the container bottom 1 may have no locking component 12, and the cutter holder 2 is directly fixed to the base 11 by means of a locking nut or other structure. In this case, an anti-disengagement matching part 13 is provided on the base 11 and matches with the anti-disengagement part 21 on the cutter holder 2, and the cutter holder 2 is prevented from being disengaged from the mounting holes 111 under the action of gravity.

Figure 5:
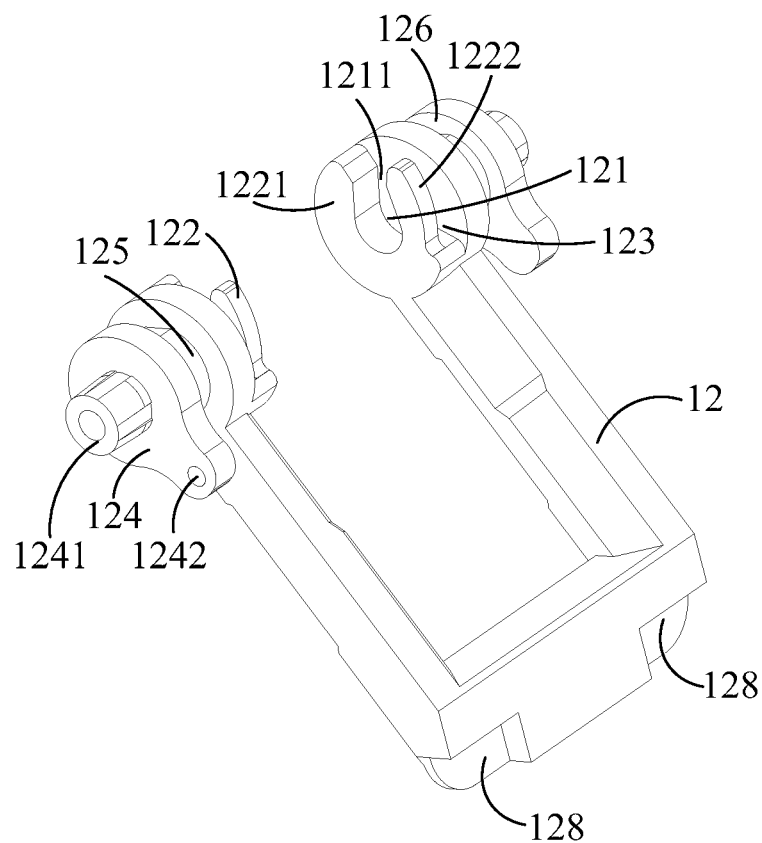
FIG. 5 is a perspective view of the locking member of FIGS. 1 and 2.
Figure 6:
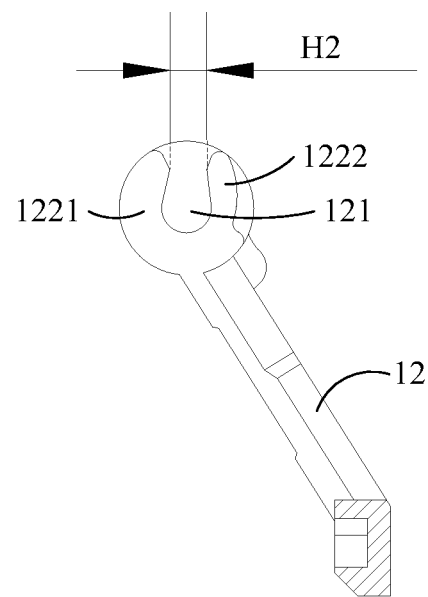
FIG. 6 is a sectional view of the locking member shown in FIG. 5.

Further, the locking component 12 is provided with a locking portion 122, as shown in FIGS. 5 and 6. The locking portion 122 includes a fixing part 1221 and an elastic part 1222 adapted to be elastically deformed, as shown in FIGS. 5 and 6. The fixing part 1221 and the elastic part 1222 enclose a locking groove 121, and one end of the elastic part 1222 is fixedly connected to one end of the fixing part 1221, and another end of the elastic part 1222 and another end of the fixing part form an insertion part into which the locking protrusion is inserted.

In one embodiment, the anti-disengagement part 21 includes a locking protrusion 22, the anti-disengagement matching part 13 includes a locking portion 122, and the minimum width H2 of the distance between another end of the elastic part and another end of the fixing part in a natural state is less than the width H1 of the locking protrusion 22.

Another end of the elastic part and another end of the fixing part form an insertion part, and the locking protrusion enters and exits the locking groove via a gap between another end of the elastic part and another end of the fixing part at the insertion part; therefore, when another end of the elastic part and another end of the fixing part are not attached together but form a gap in a natural state, the minimum width of the gap between another end of the elastic part and another end of the fixing part is greater than 0 in a natural state, and the gap is a notch of the locking groove; when another end of the elastic part and another end of the fixing part are attached together in a natural state, the minimum width of the distance between another end of the elastic part and another end of the fixing part in the natural state is 0. Since the minimum width of the distance between another end of the elastic part and another end of the fixing part is smaller than the width of the locking protrusion 22 in a natural state, the locking protrusion 22 is restricted by the locking portion 122 and cannot be directly disassembled without external force during the disassembly of the cutter, and the locking protrusion 22 can serve as at least a part of the anti-disengagement part 21 and the locking portion 122 can serve as at least a part of the anti-disengagement matching part 13.

In addition, the locking groove 121 is surrounded by the fixing part 1221 and the elastic part 1222, and since the elastic part 1222 can be elastically deformed, the insertion part can elastically expand and contract, and reducing the difficulty for the locking protrusion 22 to enter and exit the locking groove 121, and reducing the difficulty for assembling and disassembling the cutter set.

At the same time, the matching of the locking portion 122 and the locking protrusion 22 can also give the user a sense of proper mounting during the mounting process, to facilitate the user to know that the cutter holder 2 is properly mounted in place in time, prevent the user from using excessive force, and improve the user's mounting experience.

Note that the notch 1211 of the locking groove 121 may be a flat surface, and the minimum width of the notch 1211 of the locking groove 121 in a natural state is the width of the notch 1211. The notch 1211 of the locking groove 121 may be a three-dimensional structure having a depth, and the minimum width of the notch 1211 of the locking groove 121 in a natural state is the width of the thinnest part of the notch 1211, as shown in FIGS. 5 and 6. For example: the notch 1211 of the locking groove 121 has a substantially V-shaped structure, and the size of the notch 1211 of the locking groove 121 is gradually reduced along the direction in which the locking protrusion 22 is inserted into the locking groove 121 (as shown in FIGS. 5 and 6), and the locking protrusion 22 can be quickly inserted into the locking groove 121, and the thinnest part can play a good anti-release function, and the structure of the notch 1211 located outside the thinnest part can play a supporting function on the thinnest part, which is beneficial for improving the stability of the thinnest part and thus improving the anti-release reliability.

In one embodiment, the width H1 of the locking protrusion 22 ranges from 2 mm to 10 mm.

Restraining the width H1 of the locking protrusion 22 to be in a range of 2 mm to 10 mm, such as 2 mm, 4 mm, 6 mm, 8 mm and 10 mm, is beneficial to avoid that the difference between the width of the locking protrusion 22 and the width of the notch 1211 of the locking groove 121 is too small due to the too narrow locking protrusion 22, resulting in a weak anti-disengagement effect; it is also advantageous to avoid that the mount holes 111 are oversized due to the locking protrusion 22 being too wide and the strength of the base 11 is low, or that the locking groove 121 is oversized and the locking component 12 is oversized and it is not easy to assemble.

Of course, the width H1 of the locking protrusion 22 is not limited to the above range, and may be adjusted as needed in the actual production process.

In one embodiment, the fixing part 1221 and the elastic part 1222 each have a strip-shaped structure, as shown in FIGS. 5 and 6. Both ends of the fixing part 1221 are fixedly connected to the locking component 12. One end of the elastic part 1222 is fixedly connected to the fixing part 1221, another end of the elastic part 1222 is formed as a free end, as shown in FIG. 5, and there is an avoidance gap 123 between the elastic part 1222 and the locking component 12.

The fixing part 1221 and the elastic part 1222 are each designed in a strip-shaped structure, and the shape of the locking groove 121 can be rationally designed according to the extending direction of the fixing part 1221 and the elastic part 1222. In one embodiment, both ends of the fixing part 1221 are fixedly connected to the locking component 12, ensuring the fixing reliability of the fixing part 1221 and not moving relative to the locking component 12, and the elastic part 1222 has an avoidance gap 123 with the locking component 12 to facilitate the elastic deformation of the elastic part 1222 to adjust the width of the notch 1211 of the locking groove 121.

Example 2

Figure 11:
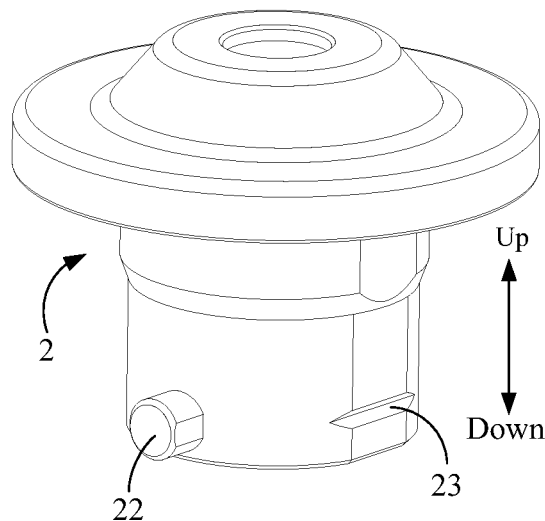
FIG. 11 is a perspective view of the cutter holder of FIG. 9.

One of the anti-disengagement part 21 and the anti-disengagement matching part 13 includes an elastic member adapted to be elastically deformed, and the other includes a clamping groove 23 (as shown in FIG. 11), the elastic member is adapted to be engaged in or disengaged from the clamping groove 23.

In this solution, during the process of mounting the cutter holder 2, the elastic member is pressed and elastically deformed until reaching the position where the clamping groove 23 matches the elastic member, and the elastic member is restore and deformed and snapped into the clamping groove 23. Therefore, when the fixed connection relationship between the cutter holder 2 and the container bottom 1 is released in the process of disassembling the cutter, the cutter holder 2 is kept stationary due to the restriction of the elastic member and the clamping groove 23 without external force, and the cutter holder 2 is prevented from being disengaged from the mounting holes 111 under the action of gravity, and preventing the cutter holder 2 from being disengaged from the mounting holes 111 under the action of gravity.

Then, it is only necessary to apply an external force to the cutter holder 2 or the container bottom 1 or to both at the same time to overcome the elastic force of the elastic member and disengage the elastic member come from the clamping groove 23, the cutter holder 2 can be pulled out of the mounting holes 111 to achieve the disassembly of the cutter holder 2.

At the same time, the matching of the elastic member and the clamping groove 23 can also enable the user to generate a hand feeling of being mounted in place during the mounting process, to facilitate the user to know that the cutter holder 2 is mounted in place in time, prevent the user from using excessive force, and improve the user's mounting experience.

In one embodiment, the elastic member may be provided on the container bottom 1, and the clamping groove 23 is provided on the cutter holder 2, as shown in FIG. 11. In one embodiment, the position may be reversed, with the elastic member provided on the cutter holder 2 and the clamping groove 23 provided on the container bottom 1.

Further, the elastic member includes at least one of an elastic snap hook 14 and an elastic snap spring 15.

Figure 10:
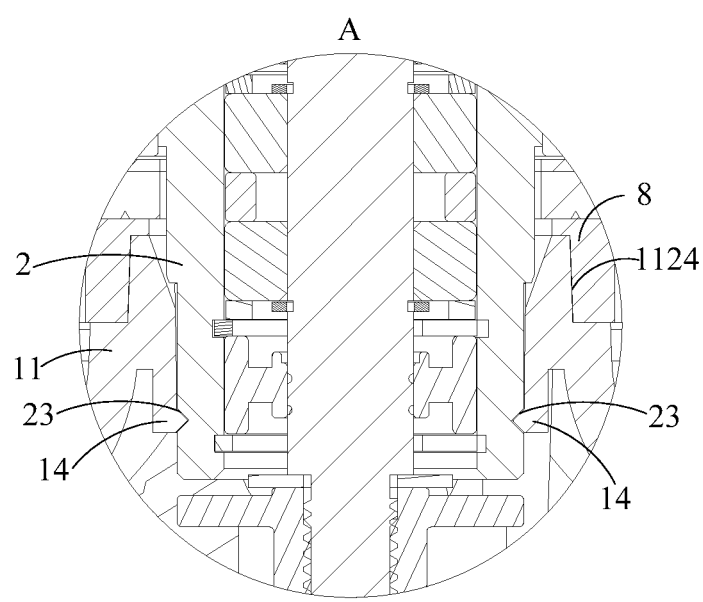
FIG. 10 is an enlarged schematic view of a part A of FIG. 9.

In one embodiment, the elastic member is an elastic snap hook 14, as shown in FIGS. 10 and 12. The elastic snap hook 14 (as shown in FIGS. 10 and 12) has a simple structure, high fastening reliability, and is easily formed integrally with the cutter holder 2 or the container bottom 1, and improving the reliability of use of the elastic snap hook 14.

Figure 14:
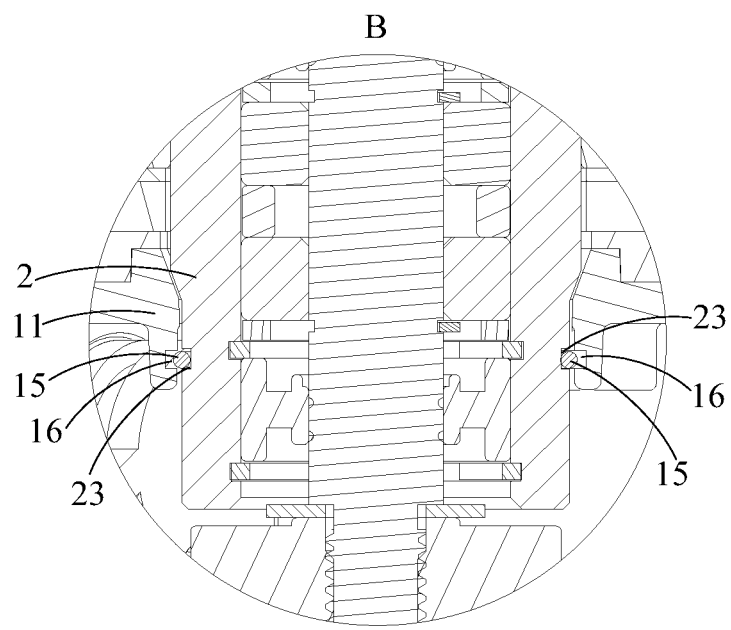
FIG. 14 is an enlarged view of a part B of FIG. 13.

Further, the elastic member is provided on the hole wall of the mounting holes 111, as shown in FIGS. 12 and 14.

The provision of the elastic member on the hole wall of the mounting holes 111 facilitates the simplification of the structure of the cutter holder 2 and the quick assembly and disassembly of the cutter holder 2 as compared with the provision on the cutter holder 2. It is advantageous to simplify the construction of the locking component 12 compared to the solution provided on the locking component 12.

Of course, the elastic member can also be provided on the cutter holder 2 or on the locking component 12.

Embodiment 3

The difference between embodiment 3 and embodiment 2 is as follows: the elastic member is an elastic snap spring 15, as shown in FIG. 14.

The elastic snap spring 15 (as shown in FIG. 14) has many models, so it is convenient to select the appropriate model according to the product requirements, and has good versatility, and is convenient for later maintenance and replacement.

In one embodiment, a positioning groove 16 is correspondingly provided on the mounting carrier of the elastic snap spring 15 (the container bottom 1 in the present embodiment), and as shown in FIG. 14, the elastic snap spring 15 is mounted at the positioning groove 16; after the assembly is completed, one part of the elastic snap spring 15 is located in the positioning groove 16, and the other part is located in the clamping groove 23, as shown in FIG. 14, and the axial movement of the cutter holder 2 relative to the container bottom 1 can be limited, and the anti-disengagement effect can be achieved.

Of course, the elastic member is not limited to the elastic snap hook 14 and the elastic snap spring 15, for example, a spring with a stopping protrusion fixedly connected thereto may also be used; a restraining slot is provided in the cutter holder 2 or the container bottom 1, the spring is limited in the restraining slot, the expansion and contraction direction of the spring is perpendicular to the central axis of the mounting holes 111, and the stopping protrusion is suitable for being engaged in or disengaged from the clamping slot 23. In one embodiment, the elastic member may be an elastic body (e.g. silica gel) provided on the hole wall of the mounting holes 111 may be crushed during the movement of the cutter holder 2, and when relatively moved to a position matching the clamping groove 23, the elastic body undergoes restore deformation and is snapped into the clamping groove 23.

In some embodiments of the present disclosure, on the basis of any one of the above-mentioned embodiments, further, there are multiple anti-disengagement parts 21, and the number of the anti-disengagement matching parts 13 is equal to and corresponds to the number of the anti-disengagement parts 21 one-to-one. In one embodiment, at least part of the anti-disengagement parts 21 are spaced apart along the circumferential direction of the mounting holes 111.

The anti-disengagement parts 21 correspond to and match with the anti-disengagement matching parts 13 on a one-by-one basis, which contributes to significantly improving the anti-disengagement reliability. In one embodiment, at least part of the anti-disengagement parts 21 are arranged at intervals along the circumferential direction of the mounting holes 111, for example, locking protrusions 22 (as shown in FIG. 3) are arranged at intervals along the circumferential direction of the mounting holes 111, and the locking protrusions 22 are inserted and fitted with the locking grooves 121, or clamping grooves 23 are arranged at intervals along the circumferential direction of the mounting holes 111, and elastic snap hooks 14 (as shown in FIGS. 10 and 12) are engaged with the clamping grooves 23, which are beneficial for balancing the force between the cutter holder 2 and the container bottom 1, and improving the connection reliability between the cutter holder 2 and the container bottom 1, and also beneficial for improving the anti-disengagement reliability.

In some embodiments of the present disclosure, on the basis of any one of the above-mentioned embodiments, further, there are multiple anti-disengagement parts 21, and the number of the anti-disengagement matching parts 13 is equal to and corresponds to the number of the anti-disengagement parts 21 one-to-one. Here, at least part of the anti-disengagement parts 21 are spaced apart in the axial direction of the mounting holes 111.

At least a portion of the anti-disengagement parts 21 are spaced apart along the axial direction of the mounting holes 111, for example, clamping grooves 23 are spaced apart along the axial direction of the mounting holes 111, and elastic snap springs 15 are engaged with the clamping grooves 23, and multiple anti-disengagement functions can be achieved and the anti-disengagement reliability can also be improved.

Of course, the number of the anti-disengagement part 21 and the anti-disengagement matching part 13 may be one, and a good anti-release function can also be achieved, for example, by the matching of an elastic snap spring 15 and a clamping groove 23.

In any of the above-mentioned embodiments, at least one of the anti-disengagement part 21 and the anti-disengagement matching part 13 includes a structure adapted to be elastically deformed.

In this solution, the structure adapted to elastically deform, such as the structure of the elastic part 1222, the elastic snap hook 14, and the elastic snap spring 15 in the above-mentioned embodiment, enables at least one of the anti-disengagement part 21 and the anti-disengagement matching part 13 to be elastically deformed, and the difficulty of achieving and removing the matching between the anti-disengagement part 21 and the anti-disengagement matching part 13 can be reduced, facilitating the quick assembly and disassembly of the cutter holder 2, and reducing the difficulty of the user's operation and improving the user's assembly and disassembly experience.

In any of the above-mentioned embodiments, the locking component 12 is a wrench which is rotatably connected to the container bottom 1.

A wrench is selected as the locking component 12, and the wrench is rotatably connected to the container bottom 1 (for example, using a hinge connection method or a method for matching a rotary shaft with a shaft hole, etc.), to ensure that the wrench can rotate to achieve the function of the assembly and disassembly cutter set thereof. Since the principle of lever can be used for the wrench, it can significantly reduce the operating force, and further reducing the difficulty of assembly and disassembly of the cutter set, making the assembly and disassembly of the cutter set more labor-saving and convenient.

Of course, the locking component 12 is not limited to a wrench and may take other forms. For example: the shape of the locking component 12 is similar to that of a wrench, but is slidably connected to the container bottom 1, and when sliding to a cutter-locking position, the locking component which catches on the cutter holder 2 achieves locking, and when sliding in the reverse direction, the locking component which disengages from the cutter holder 2 achieves unlocking; In one embodiment, the locking component 12 is a rotary ring, a groove is provided in the rotary ring, a snap protrusion is provided on the cutter holder 2, and locking is achieved when rotating until the snap protrusion snaps into the groove, and unlocking is achieved when rotating until the snap protrusion disengages from the groove.

Embodiment 4

Figure 16:
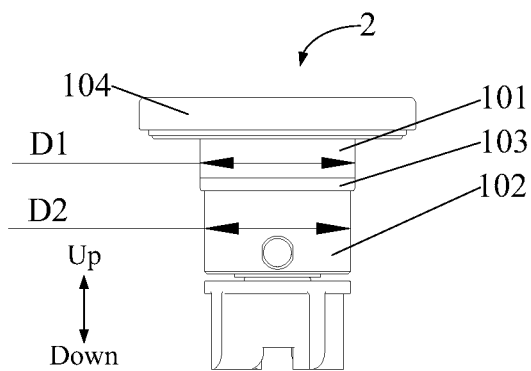
FIG. 16 is a schematic front view of a cutter holder according to some embodiments of the present disclosure.
Figure 17:
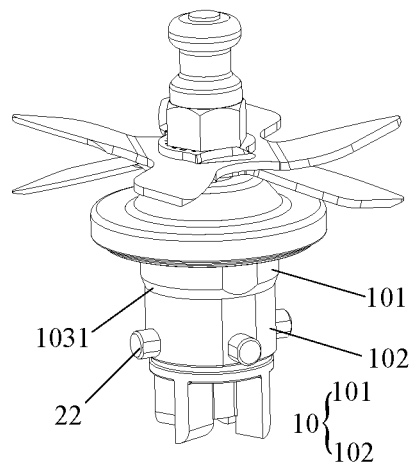
FIG. 17 is a schematic perspective view of a cutter set according to some embodiments of the present disclosure.

On the basis of any of the above-mentioned embodiments, further, the cutter holder 2 includes: a plug-in post 10, as shown in FIGS. 16 and 17. The plug-in post 10 includes a connecting upper part 101 and a connecting lower part 102 connected to a lower end of the connecting upper part 101, as shown in FIGS. 16 and 17. Both the connecting upper part 101 and the connecting lower part 102 are configured to insert-fit with the mounting holes 111. Here, the outer peripheral edge of the connecting upper part 101 protrudes from the outer peripheral edge of the connecting lower part 102, as shown in FIGS. 16 and 17.

In this solution, the shape of the plug-in post 10 of the cutter holder 2 is improved and the outer periphery of the connecting upper part 101 protrudes from the outer periphery of the connecting lower part 102, and the plug-in post 10 of the cutter holder 2 for insert-fitting with the mounting holes 111 is improved from an existing equal-thick structure to an upper-thick and lower-thin structure. Since the direction in which the cutter holder 2 is inserted into the mounting holes 111 is from the top to the bottom, the connecting lower part 102 will be inserted and fitted with the mounting holes 111 before the connecting upper part 101, and the connecting lower part 102 is relatively thin, and thus the gap between the connecting lower part 102 and the mounting holes 111 is relatively large, and it is easier to insert the mounting holes 111, and when the plug-in post 10 is inserted into the mounting holes 111, it is more convenient and easier to align, and improving the convenience of inserting and fitting the plug-in post 10 with the mounting holes 111 and improving the user's mounting experience.

Further, the cutter holder 2 further includes a supporting part 104, as shown in FIG. 16. The plug-in post 10 is inserted into the mounting holes 111 of the container bottom 1, and the supporting part 104 is supported on the container bottom 1 to prevent the cutter holder 2 from being disengaged from the container bottom 1.

In one embodiment, the connection upper part 101 and the connection lower part 102 are of equal thickness, as shown in FIGS. 16 and 17. The cross section connecting the upper part 101 is located within the range surrounded by the first reference circle, and the contour line of the cross section connecting the upper part 101 coincides with or partially coincides with the first reference circle. The cross-section of the connecting lower part 102 lies within the bounds of the first reference circle, and the contour of the cross-section of the connecting lower part 102 coincides or partially coincides with the second reference circle. The diameter D1 of the first reference circle is larger than the diameter D2 of the second reference circle, as shown in FIG. 16, and the outer periphery of the connecting upper part 101 protrudes from the outer periphery of the connecting lower part 102.

The connecting upper part 101 and the connecting lower part 102 are of an equal-thickness structure, and the cross section of the connecting upper part 101 and the cross section of the connecting lower part 102 are respectively within the range surrounded by the first reference circle and the range surrounded by the second reference circle, and the contour line of the cross section of the connecting upper part 101 coincides with the first reference circle (then the connecting upper part 101 is cylindrical) or partially coincides with the first reference circle (then the connecting upper part 101 is close to cylindrical, such as cylindrical with a cut face, prismatic, etc.); the contour line of the cross section of the connecting lower part 102 coincides with the second reference circle (then the connecting lower part 102 is cylindrical) or partially coincides (then the connecting lower part 102 is nearly cylindrical, such as a cylinder with a tangent plane, a prism, etc.), which makes the structure of the connecting upper part 101 and the connecting lower part 102 relatively regular, to facilitate processing and shaping. At the same time, the diameter of the first reference circle is larger than the diameter of the second reference circle, and the outer peripheral edge of the connecting upper part 101 can protrude from the outer peripheral edge of the connecting lower part 102, and thus the connecting lower part 102 can be quickly inserted into the mounting holes 111 to achieve quick mounting of the cutter holder 2.

The shape of the connecting upper part 101 and the connecting lower part 102 can be cylindrical or nearly cylindrical (such as cutting a part of the structure longitudinally on the basis of a cylinder to form a cut plane), and can also be prismatic or other shapes, and can be rationally designed according to requirements in the actual production process.

Further, the central axis of the first reference circle is collinear with the central axis of the second reference circle.

The central axis of the first reference circle is collinear with the central axis of the second reference circle, and the outer periphery of the connecting upper part 101 protrudes relatively uniformly from the connecting lower part 102, and the shape of the plug-in post 10 is relatively regular, to facilitate processing and shaping; it is also beneficial to improve the uniformity of the circumferential gap between the plug-in post 10 and the mounting holes 111, to facilitate sealing; at the same time, it is also advantageous for the plug-in post 10 to have a balanced force, to extend the service life of the cutter holder 2.

Further, the connecting upper part 101 and the connecting lower part 102 are connected by a transition part 103, as shown in FIGS. 16 and 17. The outer side wall of the transition part 103 is configured as a transition inclined surface 1031, as shown in FIGS. 16 and 17.

By providing a transition part 103 between the connecting upper part 101 and the connecting lower part 102, and constructing the outer side wall of the transition part 103 as a transition inclined surface 1031, the transition inclined surface 1031 functions as a smooth transition, and the outer side wall of the plug-in post 10 does not have a rib structure, facilitating smooth insertion of the connecting lower part 102, the transition part 103 and the connecting upper part 101 into the mounting holes 111 in sequence during the insertion of the cutter holder 2, significantly reducing the probability of jamming or even jamming, and facilitating improving the smoothness of the insertion of the cutter holder 2 into the mounting holes 111, and further facilitating further improving the mounting efficiency of the cutter holder 2.

Figure 8:
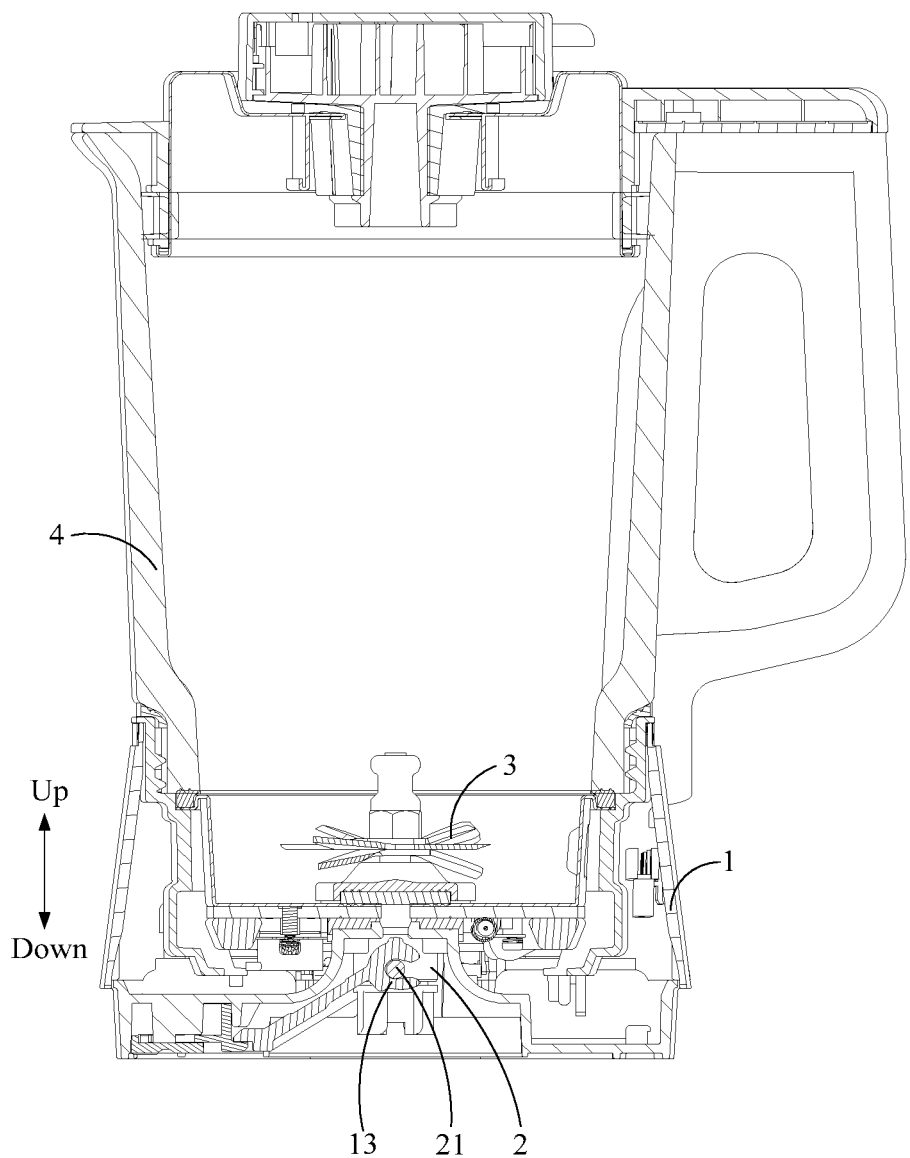
FIG. 8 is a schematic cross-sectional view of the mixing cup of FIG. 7 in a second state.
Figure 9:
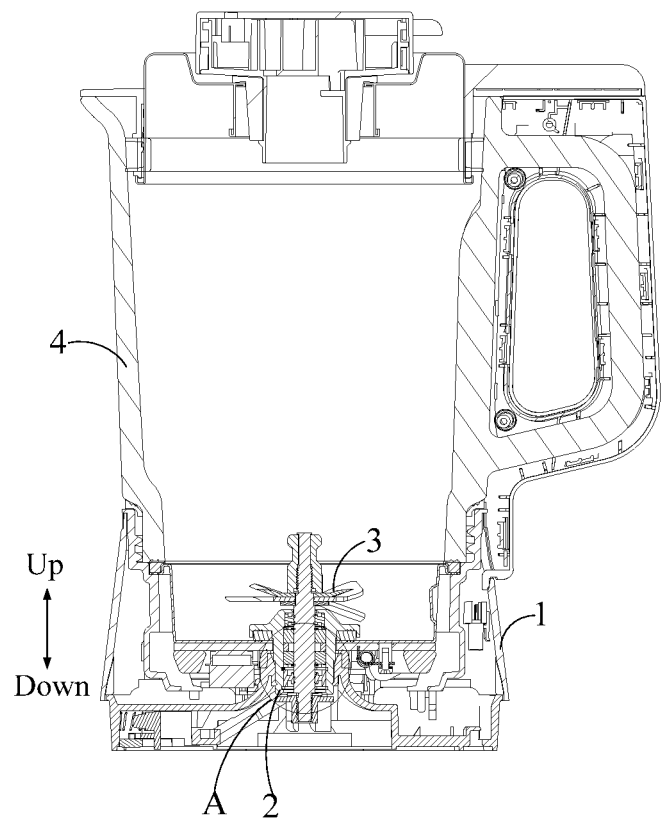
FIG. 9 is a schematic cross-sectional view of a mixing cup according to another embodiment of the present disclosure.

Further, the cutter holder 2 further includes a locking protrusion 22 (as shown in FIG. 17) provided on a side wall surface of the plug-in post 10 for penetrating through a correspondingly provided avoidance groove 118 of the container bottom 1 to match with the locking component 12 of the container bottom 1 to lock the cutter holder 2 (as shown in FIGS. 2 and 8) or unlock the cutter holder 2 (as shown in FIGS. 1 and 7).

The cutter holder 2 further includes a locking protrusion 22 arranged on the side wall surface of the plug-in post 10, the container bottom 1 is correspondingly provided with an avoidance groove 118, and the avoidance groove 118 is in communication with the mounting holes 111 to ensure that the cutter holder 2 can be smoothly inserted into the container bottom 1. In the specific assembly, the plug-in post 10 is aligned with the mounting holes 111, and the cutter holder 2 is rotated until the locking protrusion 22 is aligned with the avoidance groove 118, and then the cutter holder 2 is moved from top to bottom, and the plug-in post 10 is inserted into the mounting holes 111 and the locking protrusion 22 passes through the avoidance groove 118. When the locking protrusion 22 passes through the avoidance groove 118 and can be engaged with the locking component 12 of the container bottom 1, the locking component 12 can lock the cutter holder 2 to ensure that the cutter holder 2 cannot be loosened during use or unlock the cutter holder 2 to ensure that the cutter holder 2 can be smoothly disassembled and disassembled.

In one embodiment, the locking component 12 is provided with a locking groove 121, when the opening of the locking groove 121 faces upwards (as shown in FIGS. 1 and 7), after the locking protrusion 22 is inserted into the locking groove 121 from the top downwards, and the locking component 12 is rotated and the opening of the locking groove 121 faces in the other direction (as shown in FIGS. 2 and 8), then the locking protrusion 22 is confined in the locking groove 121 and cannot escape, and the cutter holder 2 can be locked on the container bottom 1; when the locking component 12 is rotated until the opening of the locking groove 121 faces upwards, the locking protrusion 22 can freely enter and exit the locking groove 121, and the cutter holder 2 can be unlocked, and the plug-in post 10 can be pulled out of the mounting holes 111 to disengage the cutter holder 2 from the container bottom 1.

More In one embodiment, the locking component 12 is a wrench, and when the wrench is snapped from the cutter removing position to the cutter locking position, the locking groove 121 on the wrench will fasten the locking protrusion 22 on the cutter holder 2, to fix the cutter holder 2. When the locking lever is snapped from the cutter locking position to the cutter removing position, the locking protrusion 22 on the cutter holder 2 is not fastened and the cutter holder 2 can be removed from the cup bottom cover 112.

In the above-mentioned embodiment, the number of locking protrusions 22 is at least three, and locking protrusions 22 are spaced apart along the circumference of the plug-in post 10.

The number of locking protrusions 22 is at least three, and locking protrusions 22 are arranged at intervals along the circumferential direction of the plug-in post 10. Compared with the conventional one locking protrusion 22 or two locking protrusions 22, the included angle between adjacent locking protrusions 22 can be reduced, and the rotation amplitude when the cutter holder 2 is aligned with the container bottom 1 can be reduced, and the cutter holder 2 is more easily aligned with the container bottom 1, facilitating the insertion of the cutter holder 2 into the container bottom 1, and improving the experience for mounting the cutter holder 2.

Figure 18:
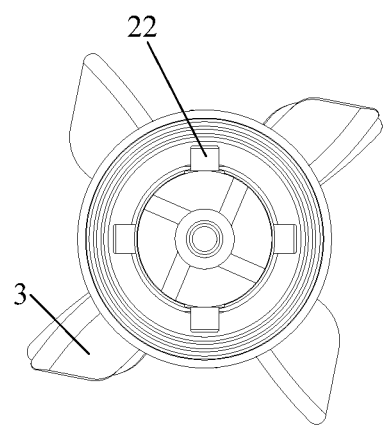
FIG. 18 is a schematic plan view of the cutter set shown in FIG. 17.

More In one embodiment, the number of the locking protrusions 22 is four, as shown in FIG. 18. The four locking protrusions 22 are divided into two groups, and the two locking protrusions 22 of each group are mirror-symmetrical about the central axis of the plug-in post 10, as shown in FIG. 18.

The corresponding locking component 12 can be symmetrically provided with two locking grooves 121, and then both the two locking protrusions 22 of each group can match with the two locking grooves 121, thus both reducing the difficulty of aligning the cutter holder 2 and improving the assembly efficiency of the cutter holder 2; in addition, it is beneficial to balance the forces of the cutter holder 2 and the locking component 12, and improving the reliability of the locking cutter. At the same time, it is advantageous to simplify the structure of the locking component 12, and for the solution that the locking component 12 itself is symmetrically provided with two locking grooves 121, there is no need to improve the structure of the locking component 12, and the versatility of the locking component 12 is improved. In addition, this solution also makes the overall structure of the cutter holder 2 more regular, facilitates the processing and shaping, and also helps to improve the aesthetics of the product.

Of course, the number of the locking protrusions 22 is not limited to four, but may be three, five, six, eight, etc.

Figure 24:
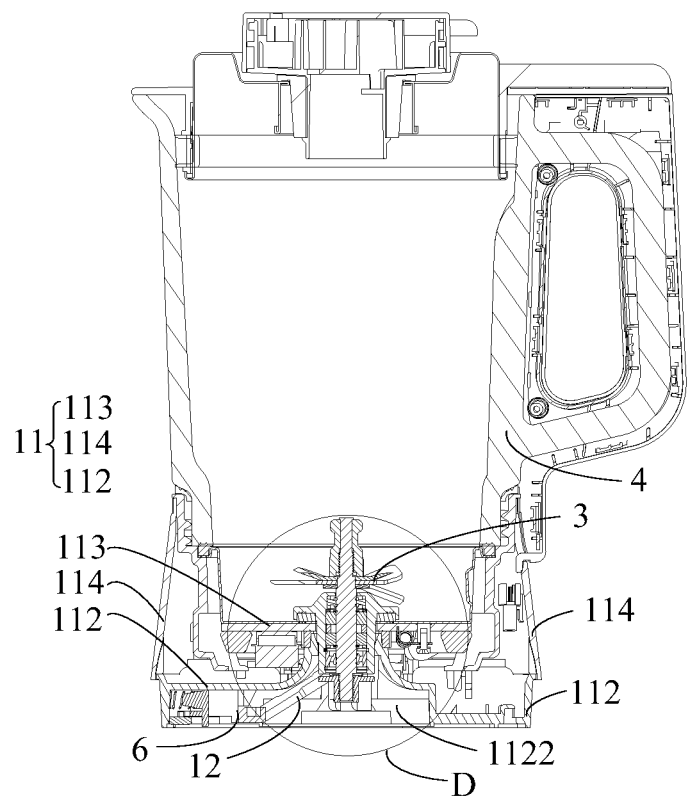
FIG. 24 is a schematic cross-sectional view of a mixing cup according to some embodiments of the present disclosure.
Figure 25:
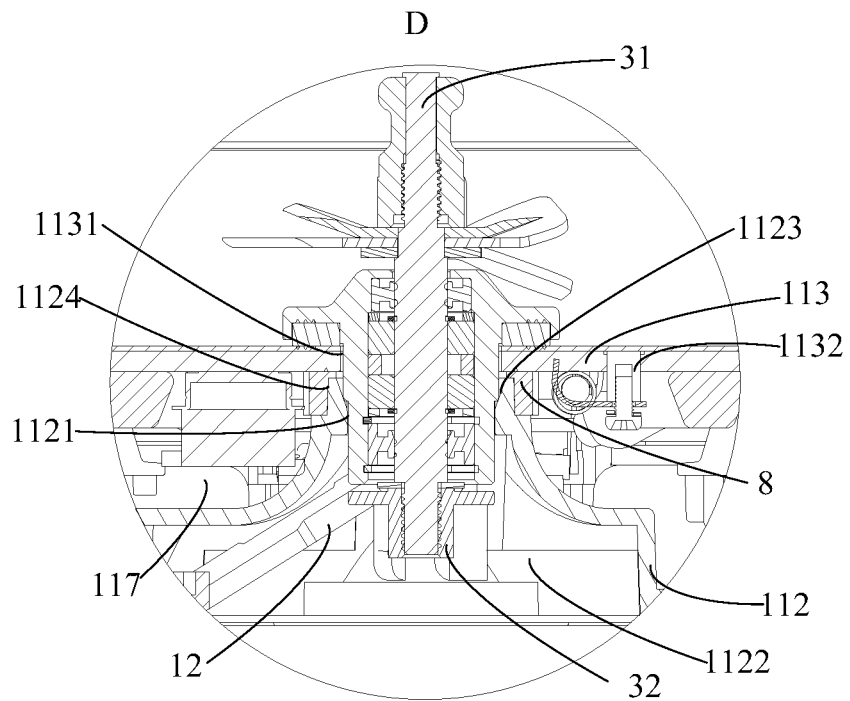
FIG. 25 is an enlarged schematic view of a part D in FIG. 24.

Here, the base 11 includes a cup bottom cover 112 and a heating plate 113 positioned above the cup bottom cover 112, as shown in FIG. 24. The cup bottom cover 112 is connected to the bottom of the cup body, the heating plate 113 is provided with a first insertion hole 1131, and the cup bottom cover 112 is provided with a second insertion hole 1121, as shown in FIG. 25. The mounting holes 111 includes a first insertion hole 1131 and a second insertion hole 1121, the connecting upper part 101 of the plug-in post 10 is inserted and fitted with the first insertion hole 1131, and the connecting lower part 102 of the plug-in post 10 is inserted and fitted with the second insertion hole 1121, as shown in FIG. 25.

The base 11 includes a cup bottom cover 112 and a heating plate 113, and the cup bottom cover 112 is connected to the bottom of the cup body, and the heating plate 113 is located above the cup bottom cover 112 for heating food materials in the cup body. The heating plate 113 is provided with a first insertion hole 1131, the cup bottom cover 112 is provided with a second insertion hole 1121, and the mounting holes 111 include the first insertion hole 1131 and the second insertion hole 1121; during mounting, the connecting lower part 102 firstly passes through the first insertion hole 1131 of the heating plate 113, then the connecting lower part 102 is inserted and fitted with the second insertion hole 1121 of the cup bottom cover 112, and the connecting upper part 101 is inserted and fitted with the first insertion hole 1131 of the heating plate 113, to realize the insertion and fitting of the plug-in post 10 and the mounting holes 111, and completing the positioning and mounting of the cutter holder 2.

In one embodiment, the gap between the connecting lower part 102 and the second insertion hole 1121 is equal to or smaller than the gap between the connecting upper part 101 and the first insertion hole 1131.

By making the gap between the connecting lower part 102 and the second insertion hole 1121 not greater than (equivalent to less than or equal to) the gap between the connecting upper part 101 and the first insertion hole 1131, since the connecting lower part 102 is thinner than the connecting upper part 101, the gap between the connecting lower part 102 and the first insertion hole 1131 is relatively larger during the mounting of the cutter holder 2, to facilitate the connecting lower part 102 to be quickly inserted into the first insertion hole 1131 and pass through the first insertion hole 1131, and achieving the quick mounting of the cutter holder 2; when the connecting lower part 102 is inserted into the second insertion hole 1121 through the first insertion hole 1131, the gap between the connecting lower part 102 and the second insertion hole 1121 is relatively small, and it is possible to prevent the connecting lower part 102 from being shaken, to improve the centrality of the cutter holder 2 and the stirring cup, to reduce the vibration of the cutter holder 2, and to improve the mounting stability of the cutter holder 2, and to reduce the noise caused by the vibration of the cutter holder 2, and to improve the user's experience.

Further, the cup bottom cover 112 is provided with a guide inclined surface 1123 for guiding the insertion of the connecting lower part 102 into the second insertion hole 1121 as shown in FIG. 25.

By providing the guide inclined surface 1123 on the cup bottom cover 112, the guide inclined surface 1123 can play a guiding role to facilitate the quick and smooth insertion of the connecting lower part 102 into the second insertion hole 1121, to further improve the convenience of inserting the connecting lower part 102 into the second insertion hole 1121, and further improve the mounting efficiency of the cutter holder 2.

Embodiment 5

Figure 22:
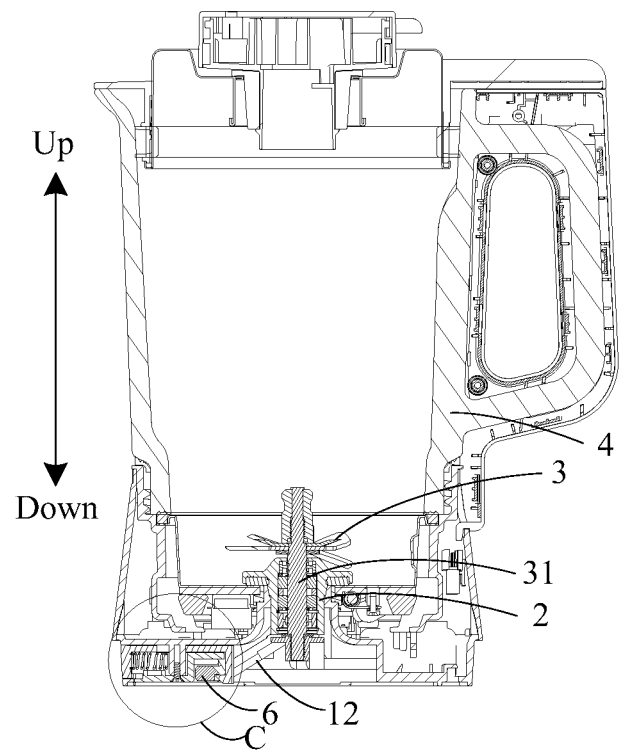
FIG. 22 is a schematic cross-sectional view of a mixing cup according to some embodiments of the present disclosure.
Figure 26:
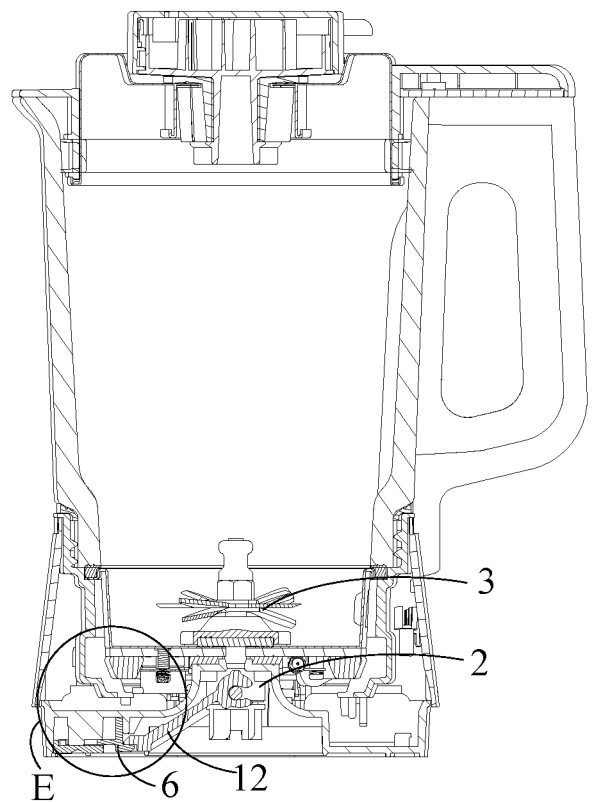
FIG. 26 is a schematic cross-sectional view of a mixing cup according to some embodiments of the present disclosure.

Based on any of the above-mentioned embodiments, further, the cutter set mounting structure further includes: a restraining mechanism 6, as shown in FIGS. 22, 24 and 26. A restraining mechanism 6 is provided on the base 11 and matches with the locking component 12 for locking the locking component 12 in the cutter locking position (as shown in FIGS. 23 and 27) to limit movement of the locking component 12 to the cutter removing position.

The cutter set mounting structure further includes a restraining mechanism 6, and the restraining mechanism 6 can lock the locking component 12 in the cutter locking position and prevent the locking component 12 from reverse movement during use, and improving the locking reliability of the locking component 12 to the cutter holder 2 and ensuring that the cutter holder 2 does not loosen during use, and improving the use safety of the product.

Figure 23:
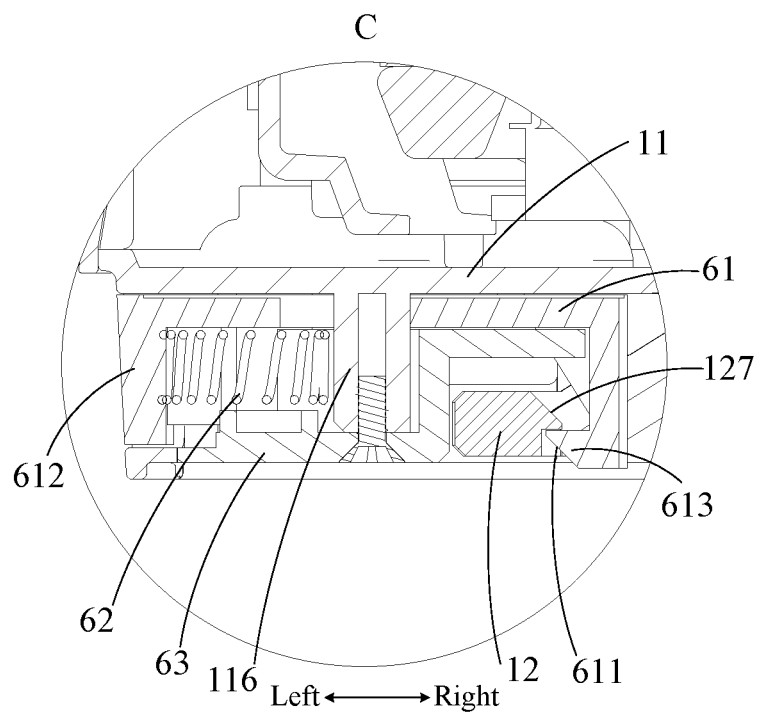
FIG. 23 is an enlarged structural view of a part C in FIG. 22.
Figure 27:
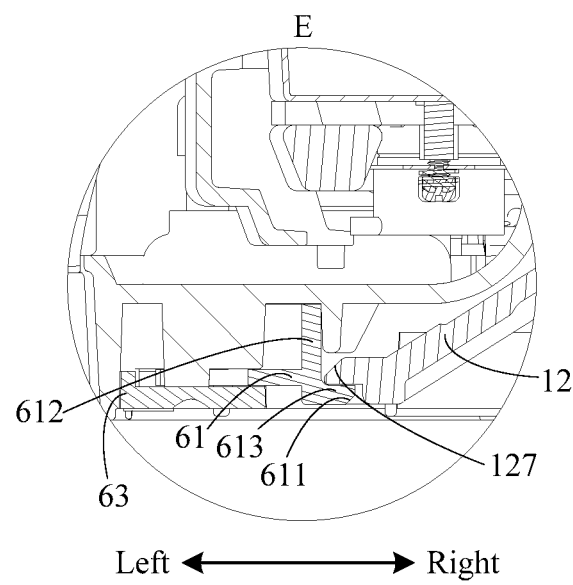
FIG. 27 is an enlarged schematic view of a part E in FIG. 26.

In one embodiment, the restraining mechanism 6 includes: a restraining member 61, as shown in FIGS. 23 and 27. A restraining member 61 is provided on the base 11 and is adapted to reciprocate relative to the base 11 to lock the locking component 12 in the cutter locking position or unlock a locking of the locking component 12 (as shown in FIGS. 23 and 27).

A restraining member 61 reciprocates movement is provided on the base 11, and when the locking component 12 moves to the cutter locking position, the restraining member 61 can be moved to the position for locking the locking component 12, and when the locking component 12 needs to move to the cutter removing position, the restraining member 61 can be moved to the position for unlocking the locking component 12, which is simple in principle and easy to implement.

Further, as shown in FIGS. 23 and 27, the locking component 12 is provided with a drive surface 127 and the restraining member 61 is provided with an matching face 611, at least one of the driving surface 127 and the matching face 611 being configured as a ramp, the drive surface 127 being adapted to abut against the matching face 611 and the locking component 12 moves the restraining member 61 during movement toward the cutter locking position. The restraining member 61 restores upon movement of the locking component 12 to the cutter locking position and locks the locking component 12 in the cutter locking position, as shown in FIGS. 23 and 27.

Configuring at least one of the driving surface 127 of the locking component 12 and the matching face 611 of the restraining member 61 as an inclined surface enables the driving surface 127 and the matching face 611 to move in different directions when contacting and interacting with the matching face 611. In this manner, the locking component 12 and the restraining member 61 may be moved differently, such as one to rotate, one to slide, or both to slide but in different directions, to reasonable design of the movement of the locking component 12 and the restraining member 61 to optimize the structure and performance of the product according to the requirements of the product.

In FIG. 23, during the rotation of the locking component 12 to the cutter locking position, the driving surface 127 pushes the matching face 611 to move to the right, and the restraining member 61 moves to the right to avoid the locking component 12, and the locking component 12 can reach the cutter locking position, and then the restraining member 61 moves to the left to restore, hooking the locking component 12, and abuts and matches with the locking component 12 to lock the locking component 12 in the cutter locking position.

In FIG. 27, during the rotation of the locking component 12 to the cutter locking position, the driving surface 127 pushes the matching face 611 to move to the left, and the restraining member 61 moves to the left to avoid the locking component 12, and the locking component 12 can reach the cutter locking position, and then the restraining member 61 moves to the right to restore, hooking the locking component 12, and abuts and matches with the locking component 12 to lock the locking component 12 in the cutter locking position.

Further, as shown in FIG. 23, the restraining mechanism 6 further includes: and a restoring member 62, which is matched with the restraining member 61, and is used for driving the restraining member 61 to restore using a restore elastic force thereof.

During the movement of the locking component 12 to the cutter locking position, the restraining member 61 is driven by the locking component 12 to move to a position away from the locking component 12 to ensure that the locking component 12 can move smoothly to the cutter locking position. In this process, the restoring member 62 is elastically deformed to store the elastic potential energy, and when the locking component 12 moves to the cutter locking position, the restraining member 61 is no longer limited by the locking component 12, and is automatically restore under the restore elastic force of the restoring member 62, and locking the locking component 12 in the cutter locking position. Thus, there is no need for the user to manually restore the restraining member 61, improving the user's use experience. At the same time, the restraining member 61 cannot freely move due to the restriction of the restoring member 62, and stably stays at the position where the locking component 12 is locked, and improving the locking reliability of the locking component 12. However, when the locking component 12 needs to move from the cutter locking position to the cutter removing position, only the restraining member 61 needs to be moved against the elastic force of the restoring member 62, the locking of the locking component 12 can be released, ensuring that the locking component 12 can smoothly move to the cutter removing position. Of course, it is also possible to remove the restoring member 62 and manually operate the restraining member 61 to restore it.

Further, as shown in FIG. 23, the restoring member 62 is a spring, the base 11 is provided with a stop part 116, and both ends of the spring abut against the stop part 116 and the restraining member 61, respectively.

A stop part 116 is provided on the base 11, and the restoring member 62 is in the form of a spring, and two ends of the spring respectively abut against the stop part 116 and the restraining member 61, and one end of the spring abutting against the stop part 116 remains stationary, and one end of the spring abutting against the restraining member 61 moves along with the movement of the restraining member 61, and elastically deforming the spring. This embodiment is simple in construction, ingenious in design, and low in cost. Of course, the restoring member 62 is not limited to a spring type, and may have an elastic structure such as a spring plate or an elastic body.

Further, as shown in FIG. 23, the restraining member 61 is provided with an operation part 612 for moving the restraining member 61 to unlock the locking component 12.

When the locking component 12 needs to move from the cutter locking position to the cutter removing position, the operation part 612 of the restraining member 61 applies a driving force to the restraining member 61, and the restraining member 61 can be driven to move relative to the locking component 12, and unlocking the locking component 12, and the operation is convenient and quick. In one embodiment, the operation part 612 may have, but is not limited to, a plate-like structure, a columnar structure, a block-like structure, or the like.

In the above-mentioned embodiment, as shown in FIG. 27, there is a movable space between the operation part 612 and the side wall of the base 11, and the operation part 612 is configured to move in a direction close to the side wall of the base 11 to drive the restraining member 61 to unlock the locking component 12; In one embodiment, the side wall of the base 11 is provided with a gap for accommodating the operation part 612, which is configured to move in the direction of retraction into the base 11 to bring the restraining member 61 to unlock the locking component 12, as shown in FIG. 23.

A movable space is provided between the operation part 612 and the side wall of the base 11 and the operation part 612 can reciprocate in the movable space to be close to the side wall of the base 11 or away from the side wall of the base 11. In one embodiment, when the operation part 612 moves in a direction close to the side wall of the base 11, the restraining member 61 can be driven to unlock the locking component 12, and when the operation part 612 moves in a direction away from the side wall of the base 11, the restraining member 61 can be driven to lock the locking component 12 in the cutter locking position. Since there is a movable space between the operation part 612 and the side wall of the base 11 when the restraining member 61 locks the locking component 12, a driving force is applied to the operation part 612 from below the base 11. This embodiment ensures the integrity of the side walls of the base 11 and contributes to the strength of the base 11. In FIG. 27, the restraining member 61 moves to the left near the side wall of the base 11 and unlock the locking component 12.

A gap is provided in the side wall of the base 11 in which the operation part 612 can be accommodated. When the operation part 612 moves in the direction of retracting the base 11, the restraining member 61 can be driven to unlock the locking component 12, and when the operation part 612 moves in the direction of inserting the gap, the restraining member 61 can be driven to lock the locking component 12 in the cutter locking position. Since the operation part 612 is located just inside the gap when the restraining member 61 locks the locking component 12, the driving force can be directly applied to the operation part 612 through the gap. In this embodiment, the position of the operation part 612 is known, and the operation can be performed without the user hanging the base 11, which is convenient for the user to grasp and improves the user's use experience. In FIG. 23, the restraining member 61 is retracted to the right into the base 11 to unlock the locking component 12.

In any of the above-mentioned embodiments, as shown in FIGS. 23 and 27, the restraining mechanism 6 further includes: the cover 63 is connected to the base 11 and encloses a restraining space with the base 11, and the restraining member 61 is located in the restraining space.

The provision of the cover 63 can limit the restraining member 61, prevent the restraining member 61 from being separated from the base 11, and improve the reliability of use of the restraining member 61. Further, the restoring member 62 may also be provided in spacing space to improve the reliability of use of the restoring member 62. With regard to the embodiment in which there is a movable space between the operation part 612 of the restraining member 61 and the side wall of the base 11, the cover 63 is further provided with an avoidance gap for avoiding the operation part 612, to ensure that the operation part 612 is not blocked by the cover 63, and facilitate user operation.

In any of the above-mentioned embodiments, as shown in FIGS. 5, 23 and 27, the locking component 12 is provided with at least one latching part 128 and the restraining member 61 is provided with at least one matching part 613, the locking components 128 engaging the matching parts 613 one-to-one to lock the locking component 12 in the cutter locking position.

By using the cooperation of the latching part 128 and the matching part 613 to lock the locking component 12 in the cutter locking position, the stability of the locking component 12 in the cutter locking position is effectively improved, and the shape and size of the latching part 128 and the matching part 613 can be rationally designed according to requirements to optimize the product structure and performance.

In the above-mentioned embodiment, the latching part 128 is a first hook part, and the matching part 613 is a second hook part, and the first hook part is hooked and engaged with the second hook part, as shown in FIGS. 23 and 27.

Both the latching part 128 and the matching part 613 are in the form of hook parts that are restrained from each other in a hook connection-and-matching manner to effectively prevent reverse movement of the locking component 12. Of course, the latching part 128 and the matching part 613 are not limited to the engagement form of the first hook part and the second hook part, but may be the engagement form of the insert block and the insert groove, the engagement form of the insert groove and the insert block, the engagement form of the snap and the snap hole, the engagement form of the stop block and the stop surface, etc.

In the above-mentioned embodiment, the number of the matching parts 613 is two, and the two matching parts 613 are spaced apart; the restoring member 62 of the restraining mechanism 6 is located between the two matching parts 613.

The two matching parts 613 match with the two latching parts 128 one-to-one to achieve double locking, which is beneficial to further improve the locking reliability of the restraining mechanism 6 to the locking component 12. Providing the restoring member 62 of the restraining mechanism 6 between the two matching parts 613 facilitates the force equalization of the restoring member 62, to reduce the probability of the restoring member 62 being inclined, displaced, etc. and improving the reliability of use of the restoring member 62.

Embodiment 6

Figure 19:
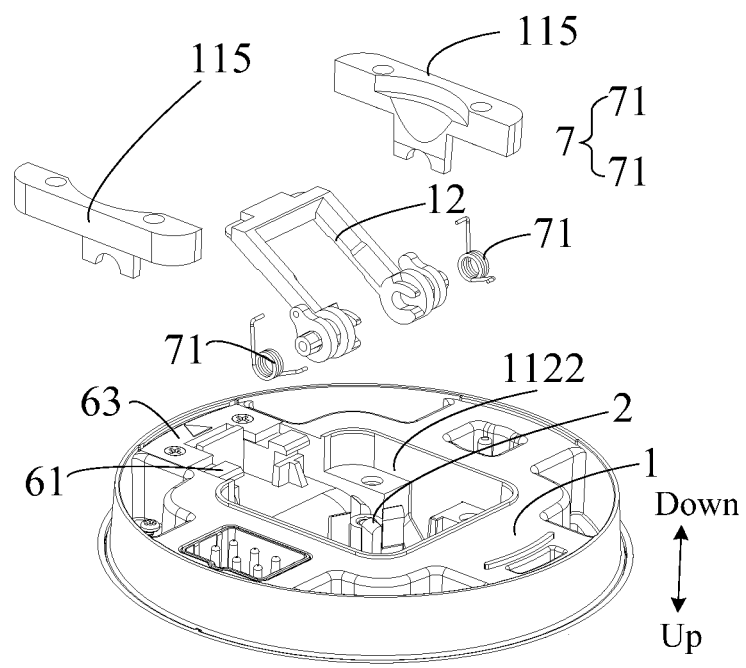
FIG. 19 is an exploded perspective view of a cutter set mounting structure according to some embodiments of the present disclosure.

Based on any of the above-mentioned embodiments, further, the cutter set mounting structure further includes: a locking and matching mechanism 7, as shown in FIG. 19, is provided on the base 11 to engage the locking component 12 for positioning the locking component 12 in a cutter removing position to limit movement of the locking component 12 relative to the base 11.

The cutter set mounting structure further includes a locking and matching mechanism 7, and the locking and matching mechanism 7 can match with the locking component 12 to position the locking component 12 at the cutter removing position, to prevent the locking component 12 from shaking, moving, swinging, etc. When it is located at the cutter removing position, and effectively improving the stability and accuracy of the locking component 12 when it is located at the cutter removing position, without interfering with the assembly and disassembly of the cutter holder 2, and facilitating the rapid insertion and rapid removal of the cutter holder 2 into and from the mounting holes 111, effectively reducing the difficulty of assembly and disassembly of the cutter holder 2, and improving the ease of use of the cutter holder 2.

In one embodiment, the locking and matching mechanism 7 includes: an elastic member 71, as shown in FIG. 19. The elastic member 71 matches with the locking component 12 to resiliently deform during movement of the locking component 12 relative to the base 11 and to provide at least a part of the driving force urging the locking component 12 to the cutter removing position during restore deformation.

In this solution, when the locking component 12 is moved relative to the base 11, the elastic member 71 is elastically deformed, and during the restore deformation of the elastic member 71, at least a part of the driving force for pushing the locking component 12 to the cutter removing position can be provided, and the elastic member 71 can push the locking component 12 to the cutter removing position alone or match other external forces. This advantageously reduces the difficulty of movement of the locking component 12 from the cutter locking position to the cutter removing position, reduces the external force applied by the user, and thus reduces the difficulty of removing the cutter. Also, in such a design that the restore deformation of the elastic member 71 occurs during the movement of the locking component 12 to the cutter removing position, the locking component 12 in the cutter removing position must overcome the restore elastic force of the elastic member 71 to be moved relative to the base 11. Thus, without any external force, the locking component 12 is stably positioned in the cutter removing position by being restrained by the elastic member 71, facilitating the quick removal of the cutter holder 2. Further, the elastic member 71 is in a natural state with the locking component 12 in the cutter removing position, and the locking component 12 can be positioned in the cutter removing position only by means of the elastic member 71, which is advantageous for further improving the reliability of positioning the locking component 12 in the cutter removing position, and for simplifying the locking and matching mechanism 7.

Of course, the locking and matching mechanism 7 is not limited to the form of the elastic member 71. For example, the locking and matching mechanism 7 may also use a clamp which is detachably connected to the base 11, and the locking component 12 is locked in the cutter removing position by the clamp; In one embodiment, the locking and matching mechanism 7 employs a stop member movably connected to the base 11, and the locking component 12 is held in the cutter removing position by the stop engagement of the stop member.

At the same time, the provision of the restraining mechanism 6 also ensures that the locking component 12 in the cutter locking position does not shake or even move in a reverse direction under the action of the restore elastic force of the elastic member 71, and ensuring the stability of the locking component 12 in the cutter locking position.

Figure 20:
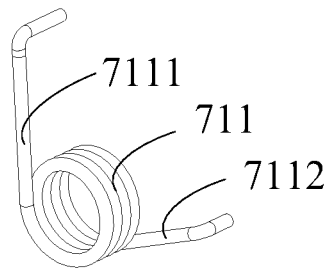
FIG. 20 is a schematic view of an elastic member according to some embodiments of the present disclosure.

Further, the locking component 12 is movably connected to the base 11, and the elastic member 71 includes a torsion spring 711, as shown in FIG. 20. The torsion spring 711 includes a first torsion arm 7111 that rests on or against the locking component 12 and a second torsion arm 7112 that rests on or against the base 11.

Since the locking component 12 is movably connected to the base 11, for example, the rotation connection between the wrench and the base 11 is realized by means of a hinge connection or the way that the rotating axis 125 matches with the axial hole, etc. the elastic member 71 is in the form of a torsion spring 711 and is adapted to the movement form of the locking component 12, which is convenient to use the elasticity of the torsion spring 711 to position the locking component 12 at the cutter removing position, and the restore elasticity of the torsion spring 711 can also serve as at least a part of the driving force for the locking component 12 to move from the cutter locking position to the cutter removing position. Thus, the difficulty in moving the locking component 12 from the cutter locking position to the cutter removing position is reduced, and the user's experience is improved.

In one embodiment, the first torsion arm 7111 is limited on the locking component 12, which means that a restraining structure such as a restraining groove or an insertion hole is provided on the locking component 12, the first torsion arm 7111 is inserted into the restraining groove or the insertion hole, and the first torsion arm 7111 is prevented from moving relative to the locking component 12 by the restraining structure. The first torsion arm 7111 abuts against the locking component 12, which means that the first torsion arm 7111 directly matches with the locking component 12 in an abutting manner, and there is no need to additionally provide a structure such as a restraining groove or an insertion hole, to facilitate the simplification of the locking component 12.

By the same reasoning, restraining the second torsion arm 7112 on the base 11 refers to providing a restraining structure such as a restraining groove or an insertion hole on the base 11, inserting the second torsion arm 7112 into the restraining groove or insertion hole, and preventing the second torsion arm 7112 from moving relative to the base 11 by using the restraining structure. The second torsion arm 7112 abuts against the base 11, which means that the second torsion arm 7112 directly matches with the base 11 in an abutting manner, and there is no need to additionally provide a structure such as a restraining groove or an insertion hole, to facilitate the simplification of the base 11.

As shown in FIG. 19, the number of torsion springs 711 is two, and the two torsion springs 711 are arranged coaxially and symmetrically.

The use of two coaxially and symmetrically arranged torsion springs 711 is beneficial to further improve the stopping reliability of the elastic member 71, to effectively ensure that the locking component 12 is stably positioned at the cutter position; the return spring force of the elastic member 71 is also increased, facilitating the use of the return spring force of the two torsion springs 711 to drive the locking component 12 from the cutter locking position to the cutter removing position without requiring manual force by the user, and further improving the user experience.

Further, as shown in FIG. 5, a mounting column 1241 is provided on the locking component 12, and a torsion spring 711 is sleeved on the mounting column 1241.

Providing a mounting column 1241 on the locking component 12 and sleeving the torsion spring 711 on the mounting column 1241 are beneficial to reduce the distance between the torsion spring 711 and the locking component 12 and improve the reliability of the cooperation between the torsion spring 711 and the locking component 12.

Further, as shown in FIG. 5, the locking component 12 is provided with a positioning hole 1242, and the first torsion arm 7111 is inserted and engaged with the positioning hole 1242.

A positioning hole 1242 is provided on the locking component 12, and the first torsion arm 7111 is inserted into the positioning hole 1242 to realize the synchronous rotation of the first torsion arm 7111 and the locking component 12, and the second torsion arm 7112 is limited on the base 11 and cannot rotate freely; therefore, during the rotation of the first torsion arm 7111 with the locking component 12, the included angle between the first torsion arm 7111 and the second torsion arm 7112 changes accordingly, and the torsion spring 711 is elastically deformed.

Further, as shown in FIG. 19, the line of the torsion axis 125 of the torsion spring 711 is collinear with the line of the rotating axis 125 of the locking component 12.

The line of the torsion axis 125 of the torsion spring 711 is collinear with the line of the rotating axis 125 of the locking component 12, the first torsion arm 7111 also rotates around the line of the torsion axis 125 of the torsion spring 711 during the rotation with the locking component 12, and the torsion spring 711 can be prevented from receiving forces in other directions, which is beneficial to improving the stability and reliability of the torsion spring 711.

Figure 21:
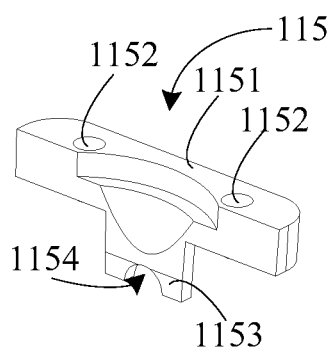
FIG. 21 is a schematic view of a fixture according to some embodiments of the present disclosure.

Further, as shown in FIGS. 19 and 21, the base 11 is provided with a fixing member 115 and a first arc-shaped groove (not shown in the figures), the fixing member 115 is provided with a second arc-shaped groove 1154, the fixing member 115 is detachably connected to the base 11, and the first arc-shaped groove and the second arc-shaped groove 1154 are spliced to form an axial hole; the locking component 12 is provided with a rotating axis 125 (as shown in FIG. 5), and the rotating axis 125 is rotatably engaged with the axial hole.

The axial hole is formed by splicing the first arc-shaped groove of the base 11 and the second arc-shaped groove 1154 of the fixing member 115, and when assembling, the rotating axis 125 of the locking component 12 can be firstly clamped in the first arc-shaped groove, and then the fixing member 115 is fixedly connected to the base 11, to realize the insertion and fitting of the rotating axis 125 and the axial hole, and the rotating axis 125 can rotate relative to the axial hole to realize the rotational connection between the locking component 12 and the base 11. Thus, the locking component 12 can be designed as a one-piece structure, which is advantageous for improving the strength and reliability of the locking component 12.

Of course, the assembly between the locking component 12 and the base 11 is not limited to the above-mentioned embodiment. For example: it is also possible to design the base 11 and the fixing member 115 as a one-piece structure, and insert the rotating axis 125 of the locking component 12 into the axial hole, and then mount an anti-release structure on the rotating axis 125 or prevent the axial movement of the rotating axis 125 by using another structure of the base 11.

Furthermore, as shown in FIG. 5, the locking component 12 is provided with a locking portion 122 and a positioning part 124, and the locking portion 122 is used for locking the cutter holder 2, and the first torsion arm 7111 is limited on the positioning part 124; the locking portion 122 and the positioning part 124 are spaced apart in the axial direction of the rotating axis 125 and define a mounting groove 126 in which a part of the fixing member 115 is fitted.

The locking component 12 is provided with a locking portion 122 and a positioning part 124, and the locking portion 122 can lock the cutter holder 2 to achieve the locking function of the locking component 12. The first torsion arm 7111 is retained on the positioning part 124 to effect engagement of the locking component 12 with the torsion spring 711. At the same time, the locking portion 122 and the positioning part 124 are spaced apart in the axial direction of the rotating axis 125 and define a mounting groove 126, and a part of the fixing member 115 is inserted into the mounting groove 126, and effectively preventing the rotating axis 125 from moving in the axial direction and effectively preventing the rotating axis 125 from exiting the axial hole, and improving the reliability of use of the locking component 12.

Further, as shown in FIG. 5, the number of the mounting grooves 126 is two, and the two mounting grooves 126 are arranged coaxially and symmetrically; the number of the fixing members 115 is two, and the two fixing members 115 correspond to the two mounting grooves 126 one-to-one.

Two coaxial mounting grooves 126 are symmetrically provided on the locking component 12, and the structure of the locking component 12 is relatively regular, facilitating the machining and forming, and balancing of the force of the locking component 12. The two mounting grooves 126 match with the two fixing members 115 one-to-one to improve the limit reliability and further improve the use reliability of the locking component 12.

Further, as shown in FIG. 21, the fixing member 115 includes a connecting part 1153 provided with a second arc-shaped groove 1154 and a fixing main body 1151 fixedly connected to the base 11.

The fixing member 115 includes two parts, equivalent to a connecting part 1153 and a fixing main body 1151, and the fixing main body 1151 can be fixedly connected to the base 11 to realize the assembly and fixing of the fixing member 115 and the base 11; the connecting part 1153 is provided with a second arc-shaped groove 1154 matches with the locking component 12. Dividing the fixing member 115 into two parts it is convenient to rationally design the shape of the fixing member 115 according to the product requirements, and optimizing the product structure and performance.

In one embodiment, the fixing main body 1151 is provided with a fixing hole 1152, and as shown in FIG. 21, the fixing hole 1152 is used for penetrating a fastener such as a bolt to fixedly connect the fixing member 115 with the base 11 and limit the locking component 12.

Further, the elastic member 71 of the locking and matching mechanism 7 is configured to drive the locking component 12 to move to the cutter removing position and position the locking component 12 at the cutter removing position using the restore elastic force thereof after the restraining mechanism 6 of the cutter set mounting structure releases the locking of the locking component 12.

After the restraining mechanism 6 releases the locking of the locking component 12, the elastic member 71 can drive the locking component 12 to automatically move from the cutter locking position to the cutter removing position by using its restore elastic force, and position the locking component 12 in the cutter removing position without manual operation by a user, thus effectively improving the user's experience. Of course, the restore elastic force of the elastic member 71 may not be sufficient to drive the locking component 12 to automatically move from the cutter locking position to the cutter removing position, and the user may apply a slight force to the locking component 12 at this time, which is convenient to operate.

Further, as shown in FIG. 24, the base 11 includes a side enclosing plate 114, a cup bottom cover 112 and a heating plate 113, and the cup bottom cover 112 is connected to the bottom of the side enclosing plate 114, and the heating plate 113 is provided in the space enclosed by the side enclosing plate 114 and the cup bottom cover 112; the heating plate 113 is provided with a first insertion hole 1131, the cup bottom cover 112 is provided with a second insertion hole 1121, and the mounting holes 111 includes the first insertion hole 1131 and the second insertion hole 1121; the cup bottom cover 112 encloses a mounting cavity 1122 for accommodating the locking component 12 and the locking and matching mechanism 7, and the opening of the mounting cavity 1122 faces downwards; the heating plate 113, the cup bottom cover 112 and the skirt plate 114 define an inner cavity 117, and a sealing member 8 for sealing the inner cavity 117 is provided between the cup bottom cover 112 and the heating plate 113, as shown in FIG. 25.

The base 11 includes a side enclosing plate 114, a cup bottom cover 112 and a heating plate 113, and the side enclosing plate 114 is connected to the bottom of the cup body of the stirring cup, and the bottom of the side enclosing plate 114 is connected to the cup bottom cover 112, and enclosing an accommodating space for accommodating food materials. The heating plate 113 is provided in the space enclosed by the side enclosing plate 114 and the cup bottom cover 112; that is, at the bottom of the accommodation space, and can heat the food materials in the accommodation space to enrich the function of the product. The heating plate 113 and the cup bottom cover 112 are respectively provided with a first insertion hole 1131 and a second insertion hole 1121, to ensure that the lower end of the cutter axis 31 in the cutter holder 2 can pass through the base 11, and then be connected to the machine base of the food processor, while the upper end of the cutter axis 31 is located in the accommodating space, and is used for connecting a cutter and driving the cutter to rotate to perform processing, such as cutting, crushing and stirring, on the food material in the accommodating space.

In one embodiment, the cup bottom cover 112 encloses a mounting cavity 1122, and the opening of the mounting cavity 1122 faces downwards, then the locking component 12 and the locking and matching mechanism 7 can be loaded into the mounting cavity 1122 from the bottom upwards, and in a specific assembly process, the base 11 can be inverted, and then the locking component 12 and the locking and matching mechanism 7 are assembled, and the assembly is more convenient, and at the same time, the locking component 12 is also exposed to facilitate the operation of the locking component 12 to fix the cutter holder 2 or release the cutter holder 2. The heating plate 113, the cup bottom cover 112 and the side enclosing plate 114 define an inner cavity 117, which can be used for mounting an electronic component, and a sealing member 8 is provided between the cup bottom cover 112 and the heating plate 113, and the liquid in the accommodating space can be prevented from entering the inner cavity 117 along the gap between the heating plate 113 and the cup bottom cover 112, and waterproofing the electronic component in the inner cavity 117 and preventing the electronic component in the inner cavity 117 from being affected by water and thus failing.

Further, as shown in FIG. 25, the heating plate 113 is provided with a connecting column 1132 fixedly connected with the cup bottom cover 112 by a fastener.

The sealing member 8 can be compressed by connecting the heating plate 113 and the cup bottom cover 112 with fasteners, and improving the sealing reliability of the sealing member 8. By providing the connecting column 1132 on the heating plate 113, the opening on the heating plate 113 can be avoided, which is advantageous for improving the heating performance of the heating plate 113.

Further, the sealing member 8 is provided with an extended edge through which a fastening member is fixedly connected with the connecting column 1132.

The fastener passes through the extending edge of the sealing member 8 and is fixedly connected to the connecting column 1132, and the sealing member 8 can be effectively prevented from dislocation, play, etc. and effectively improving the fixing reliability of the sealing member 8 and further improving the sealing reliability of the sealing member 8. In one embodiment, the extending edge may be a complete ring, surrounding the sealing member 8; the extending edge may also be non-annular, that is, the sealing member 8 is only partially provided with an extending edge, which is able to match with a fastener.

Further, as shown in FIGS. 10 and 25, the cup bottom cover 112 is provided with a step surface 1124 to which the sealing member 8 is fitted.

The engagement of the sealing member 8 with the step surface 1124 of the cup bottom cover 112 not only increases the contact area between the sealing member 8 and the cup bottom cover 112, but also enables the sealing member 8 to be forced by the cup bottom cover 112 in different directions, and further improving the fixing reliability of the sealing member 8 and further improving the sealing reliability of the sealing member 8.

An embodiment of a second aspect of the present disclosure provides a stirring cup for a food processor, comprising: a cup body 4 and a cutter set mounting structure as in any of the embodiments of the first aspect.

In one embodiment, the cup body 4 is adapted to receive a cutter 3, as shown in FIGS. 7, 8, 9 and 13. The container bottom 1 of the cutter set mounting structure is connected to the lower end of the cup body 4, and the cutter 3 is mounted on and rotatably connected to the cutter holder 2 of the cutter set mounting structure.

Embodiments of the second aspect of the present disclosure provide a stirring cup having all of the advantageous effects of any of the above-mentioned embodiments by comprising the cutter set mounting structure of any of the embodiments of the first aspect, and will not be described in detail herein.

In one embodiment, the cup body 4 can have an open structure at two ends, a sealing structure can be provided between the container bottom 1 and the lower end of the cup body 4 to ensure sealing performance, and the container bottom 1 can also be integrally connected to the cup body 4. In one embodiment, the cup body 4 has an accommodating cavity, the container bottom 1 is located below the accommodating cavity, and a structure such as a heating plate is provided between the container bottom 1 and the cup body 4; in this case, the container bottom 1 can be connected to the side wall of the cup body 4 via a side enclosing plate, then in terms of appearance, the side enclosing plate constitutes a part of the side wall of the stirring cup, the container bottom 1 is the bottom of the stirring cup, and the side enclosing plate and the container bottom 1 can be an integrated structure or a split structure.

In particular assembly, the cutter 3 may be mounted on the cutter holder 2 via the cutter axis 31 to form a cutter set, which is then assembled to the container bottom 1.

Figure 15:
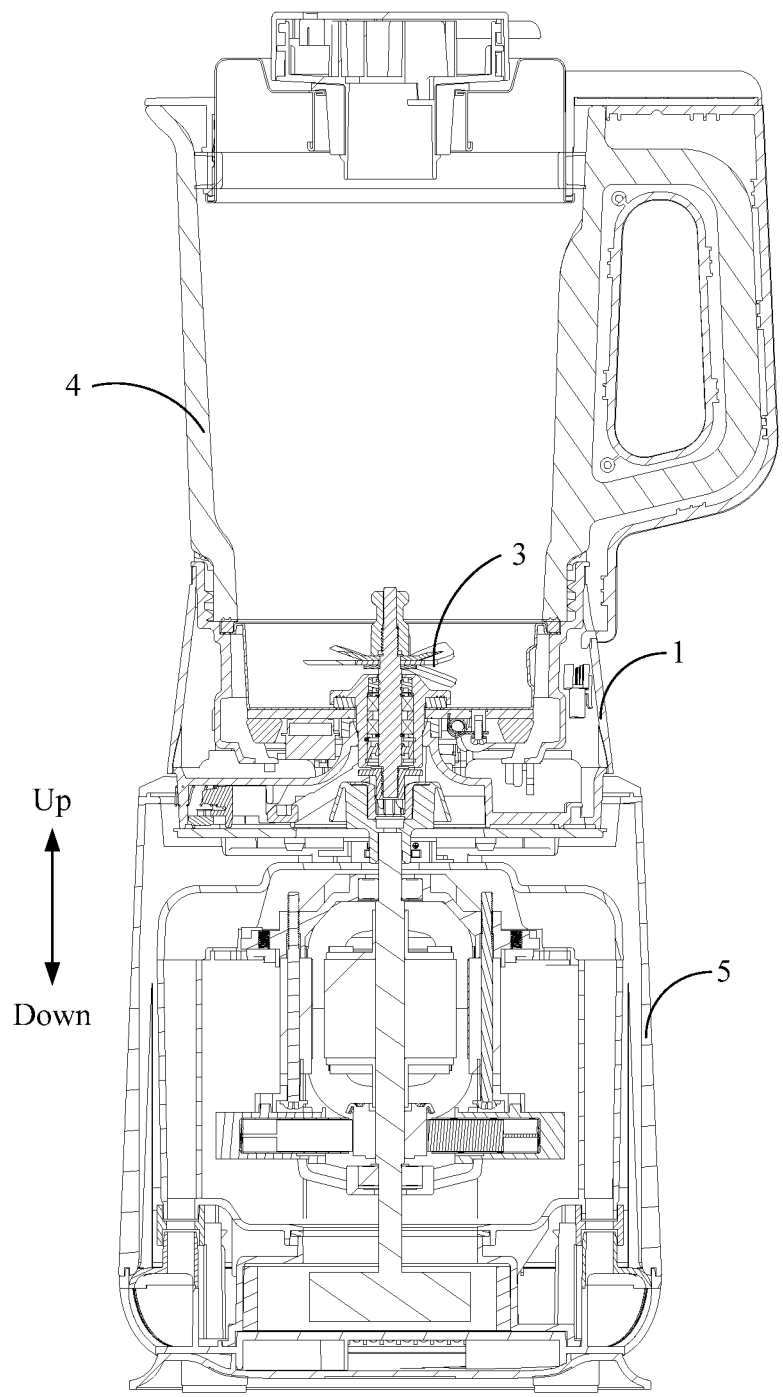
FIG. 15 is a schematic cross-sectional view of a food processor provided according to some embodiments of the present disclosure.

An embodiment of a third aspect of the present disclosure provides a food processor, as shown in FIG. 15, comprising: the stirring cup and machine base 5 of the embodiment of the second aspect. In one embodiment, the machine base 5 is located below the stirring cup and is connected to the stirring cup.

The embodiment of the third aspect of the present disclosure provides a food processor comprising a stirring cup as provided by the embodiment of the second aspect, and comprising all the advantageous effects of any of the above-mentioned embodiments, and will not be described in detail herein.

The lower end of the cutter axis 31 is provided with a coupling 32, which interfaces with the coupling of the motor in the machine base 5 and transmits the power of the motor.

In any of the above-mentioned embodiments, the food processor is a wall breaker, a processor, a juice processor, or a blender.

Of course, it is not limited to the above products, but may be other food processor such as soybean milk machine.

In some embodiments, the stirring cup includes a cup body 4 and a blade set mounting structure comprising: a container bottom 1 and a holder.

In one embodiment, the container bottom 1 is connected to the lower end of the cup body 4, and the container bottom 1 is provided with mounting holes 111. The cutter holder 2 is mounted at the mounting holes 111, the cutter holder 2 is mounted with a cutter 3 configured to be received in the cup body 4; in addition, the cutter holder 2 is provided with an anti-disengagement part 21, the container bottom 1 is provided with an anti-disengagement matching part 13, and the anti-disengagement part 21 matches with the anti-disengagement matching part 13 to limit the cutter holder 2 from falling out of the mounting holes 111 under the action of gravity.

In one embodiment, the container bottom 1 includes: a base 11 and a locking component 12; the base 11 is provided with mounting holes 111; the locking component 12 is mounted on the base 11, matches with the cutter holder 2, is adapted to reciprocate relative to the base 11 between a cutter removing position and a cutter locking position, and locks the cutter holder 2 to fix the cutter holder 2 when moving to the cutter locking position, and unlocks the cutter holder 2 when moving to the cutter removing position; and the base 11 and/or the locking component 12 are provided with an anti-disengagement matching part 13.

The cutter set mounting structure further includes: a restraining mechanism 6 and a locking and matching mechanism 7.

A restraining mechanism 6 is provided on the base 11 and matches with the locking component 12 for locking the locking component 12 in the cutter locking position to limit movement of the locking component 12 to the cutter removing position.

The restraining mechanism 6 includes: a restraining member 61 provided on the base 11 and adapted to reciprocate relative to the base 11 to lock the locking component 12 in the cutter locking position or unlock the locking component 12.

A locking and matching mechanism 7 is provided on the base 11 and matches with a locking component 12 for positioning the locking component 12 in a cutter removing position to limit movement of the locking component 12 relative to the container bottom 1.

The locking and matching mechanism 7 includes: an elastic member 71 matching with the locking component 12 to resiliently deform during movement of the locking component 12 relative to the base 11 and to provide at least a part of the driving force urging the locking component 12 to the cutter removing position during restore deformation. The locking component 12 is movably connected to the base 11, and the elastic member 71 includes a torsion spring 711, and the torsion spring 711 includes a first torsion arm 7111 that rests on or against the locking component 12 and a second torsion arm 7112 that rests on or against the base 11.

The elastic member 71 is configured to: after the restraining mechanism 6 of the cutter set mounting structure releases the locking of the locking component 12, using the restore elastic force thereof to drive the locking component 12 to move to the cutter removing position and position the locking component 12 at the cutter removing position.

The locking component 12 is rotatably connected to the base 11, a locking groove 121 is provided on the locking component 12, a locking protrusion 22 is provided on the wall surface of the cutter holder 2, and the locking protrusion 22 is adapted to be plug-fitted with the locking groove 121. The width of the locking protrusion 22 ranges from 2 mm to 10 mm.

The locking component 12 is provided with a locking portion 122, and the locking portion 122 includes a fixing part 1221 and an elastic part 1222 adapted to be elastically deformed, the fixing part 1221 and the elastic part 1222 enclose a locking groove 121, one end of the elastic part 1222 is fixedly connected to one end of the fixing part 1221, and another end of the elastic part 1222 and another end of the fixing part 1221 form an insertion part for inserting the locking protrusion 22.

The fixing part 1221 and the elastic part 1222 are both strip-shaped structures, two ends of the fixing part 1221 are fixedly connected to the locking component 12, one end of the elastic part 1222 is fixedly connected to the fixing part 1221, another end of the elastic part 1222 is formed as a free end, and there is an avoidance gap 123 between the elastic part 1222 and the locking component 12.

In one embodiment, the anti-disengagement part 21 includes a locking protrusion 22, the anti-disengagement matching part 13 includes a locking portion 122, and the minimum width of the distance between another end of the elastic part 1222 and another end of the fixing part 1221 in a natural state is less than the width of the locking protrusion 22.

In one embodiment, one of the anti-disengagement part 21 and the anti-disengagement matching part 13 includes an elastic member 71 adapted to be elastically deformed, and the other includes a clamping groove 23, the elastic member 71 being adapted to be engaged in or disengaged from the clamping groove 23, and the elastic member 71 being provided on the hole wall of the mounting holes 111.

The cutter set mounting structure, the stirring cup and the food processor provided in the present disclosure are specifically described below by taking the wall-breaking processor as an example, and three specific examples are described in conjunction with the accompanying drawings.

At present, the wall-breaking food processor is more and more popular and used by consumers, but the difficult cleaning problem of the stirring cup has been a pain point of users. To make the stirring cup easier to clean, different embodiments of removable cleaning of the cutter set are used. In some related art, the cutter holder 2 is assembled and disassembled by rotating the handle. In other related art, the cutter holder 2 is locked by breaking the locking component 12. However, when the consumer removes the cutter, the stirring cup is inverted, and when the handle or the locking component 12 is operated to unlock the cutter holder 2, the cutter set can easily fall down, damage the tabletop (ground) or damage the cutter set.

Therefore, the solution provided in the present disclosure can effectively solve the above-mentioned problem.

Specific Example 1 (as Shown in FIGS. 1 to 8)

A wall-breaking processor comprising: a stirring cup and a machine base 5, and the stirring cup includes a cutter set mounting structure and a cup body 4, the cutter set mounting structure includes a container bottom 1 and a cutter holder 2, the cutter holder 2 is mounted with a cutter 3 to form a cutter set, the container bottom 1 includes a base 11 (or called a cup bottom cover) and a locking component 12, the locking component 12 is a wrench, the wrench is rotatably connected to the base 11, the wrench is provided with a gap groove (equivalent to a locking groove 121), the cutter holder 2 is provided with a lug (equivalent to a locking protrusion 22), and the locking groove 121 is inserted and fitted with the locking protrusion 22. A locking component 12 matches with the cutter holder 2 and is adapted to reciprocate relative to the base 11 between a cutter-disassembly position and a cutter-locking position and to lock the cutter holder 2 to secure the cutter holder 2 when moved to the cutter-locking position and to unlock the cutter holder 2 when moved to the cutter-disassembly position to release the cutter holder.

Principle of detachable mounting of the cutter set in the stirring cup: when the cutter holder 2 is inserted into the mounting holes 111 of the base 11, and the wrench mounted on the bottom of the base 11 is turned from the cutter removing position to the cutter locking position, the gap groove (equivalent to the locking groove 121) on the wrench will fasten the lug (equivalent to the locking protrusion 22) on the cutter holder 2, to fix the cutter set. When the wrench is unplugged from the cutter locking position to the cutter removing position, the lugs on the cutter holder 2 are not fastened and the cutter set can be removed from the cup bottom.

In one embodiment, two lugs are symmetrically arranged on the outer side of the lower part of the cutter holder 2, and the width of the lugs is H1, 2 mm≤H1≤10 mm.

The lock rod opening groove is surrounded by the fixing part 1221 and the elastic part 1222, and the minimum distance of the opening between the fixing part 1221 and the elastic part 1222 (equivalent to the minimum width of the opening of the locking groove 121) is H2, and H2<H1.

When the elastic part 1222 is elastically deformed by an external force, the opening distance H2 of the gap groove increases, and when the external force disappears, H2 is recovered.

The Anti-Drop Principle of this Specific Example:

When the cutter set is mounted in the central hole at the bottom of the cup (equivalent to the mounting holes 111), the lug of the cutter holder 2 enters the locking groove 121 from the opening of the wrench locking groove 121, and since the width H1 of the lug is greater than the opening distance H2, the elastic part 1222 of the locking groove 121 is elastically deformed by being forced outwards, and after the cutter set is mounted in place, the elastic part 1222 of the locking groove 121 is not forced to return to the original position.

When the cutter set is removed, the user tends to invert the stirring cup. At this time, the rotation-breaking wrench is moved to the cutter removing position, and since the distance of the opening of the locking groove 121 is less than the width of the lug of the cutter holder 2, the cutter set cannot fall out at once. The cutter set is then removed from the stirring cup with slight force.

The wrench rotates from the cutter removing position to the cutter locking position when the cutter set is mounted, the fixing part 1221 of the wrench locking groove 121 will fasten the lug of the cutter holder 2, to fix the cutter set.

This gives the user a sense of proper mounting when mounting the cutter set. When the cutter set is disassembled, the wrench is turned to the cutter removing position, and even if the cup is inverted, since the lug of the cutter holder 2 is caught by the opening of the locking groove 121, the cutter set cannot easily fall out. That is, when the cup is inverted, the wrench is turned to the cutter removing position, and the cutter set is not dropped, and improving safety.

Specific Example 2 (as Shown in FIGS. 9 to 12)

An elastic snap hook 14 is provided on the inner wall of the hole (equivalent to the mounting holes 111) in the cup bottom cover, and a clamping groove 23 is provided on the outer wall of the cutter holder 2. When the cutter set is inserted into the central hole, the elastic snap hooks 14 break outwards; when the cutter holder 2 is mounted in place, the elastic snap hook 14 catches the clamping groove 23 of the cutter holder 2. Even if the cup is inverted, the wrench is in the cutter removing position, and the cutter holder 2 is caught by the elastic hook 14 and cannot be easily dropped. When the cutter set is forced outwardly, the elastic snap hook 14 deforms and the cutter set can be removed.

Figure 13:
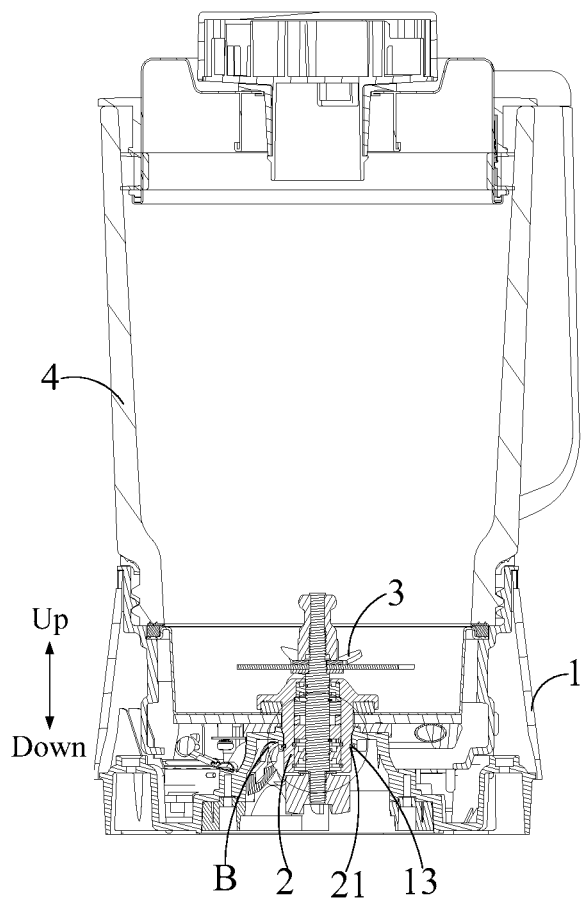
FIG. 13 is a schematic cross-sectional view of a mixing cup according to yet another embodiment of the present disclosure.

Specific Example 3 (as Shown in FIGS. 13 and 14)

A positioning groove 16 is provided on the inner wall of the hole (equivalent to the mounting holes 111) in the cup bottom cover, and a clamping groove 23 is provided on the outer wall of the cutter holder 2. An elastic snap spring 15 is mounted in a positioning groove 16 of the cup bottom cover. When the cutter set is inserted into the central hole, the elastic snap spring 15 expands outwardly, and when the cutter holder 2 is properly mounted, the elastic snap spring 15 restores and catches the cutter holder 2. Even if the cup is inverted, the wrench is in the cutter removing position, and the cutter holder 2 is caught by the elastic clamp spring 15 and cannot be easily dropped. When the cutter set is pulled outwards by force, the elastic snap spring 15 expands outwards, and the cutter set can be taken out.

In the description of the present specification, the terms "first" and "second" are used for descriptive purposes only and are not to be construed as indicating or implying relative importance unless explicitly stated or limited otherwise; the terms "connected", "mounted", "fixed", and the like are to be construed broadly, e.g., "connected" may be a fixed connection, may be a detachable connection, or may be integrally connected; they may be directly linked or indirectly linked through an intermediary. The specific meaning of the above terms in the present disclosure can be understood in accordance with embodiments of the disclosure.

In the description of the present disclosure, the description of the terms "one embodiment," "some embodiments," "a specific embodiment," etc., mean that a particular feature, structure, material, or characteristic described in connection with the embodiment or example is included in at least one embodiment or example of the present disclosure. In this description, the schematic representations of the terms used above do not necessarily refer to the same embodiment or example. Furthermore, the particular features, structures, materials, or characteristics described may be combined in any suitable manner in any embodiment or example.

What is claimed is:

1. A cutter set mounting structure of a food processor, comprising:
   a container bottom, wherein the container bottom is provided with a mounting hole;
   a cutter holder, mounted at the mounting hole for mounting a cutter of the food processor; and
   wherein the cutter holder is provided with an anti-disengagement part, the container bottom is provided with an anti-disengagement matching part, and the anti-disengagement matching part matches with the anti-disengagement part to limit the cutter holder from falling out of the mounting hole under gravitational force;
   wherein the container bottom comprises:
   a base provided with the mounting hole; and
   a locking component, mounted on the base and matching with the cutter holder and adapted to reciprocate relative to the base between a cutter removing position and a cutter locking position, and to lock the cutter holder to fix the cutter holder when moving to the cutter locking position, and to unlock the cutter holder when moving to the cutter removing position;
   a locking and matching mechanism provided on the base and matches with the locking component for positioning the locking component in the cutter removing position to limit a movement of the locking component relative to the container bottom;
   wherein the base and/or the locking component are provided with the anti-disengagement matching part;
   wherein the cutter set mounting structure further comprises a restraining mechanism provided on the base and matching with the locking component for locking the locking component in the cutter locking position to limit a movement of the locking component to the cutter removing position;
   wherein the restraining mechanism comprises a restraining member provided on the base and adapted to reciprocate relative to the base to lock the locking component in the cutter locking position or unlock a locking of the locking component, and a restoring member matched with the restraining member and configured for driving the restraining member to restore previous position;
   during movement of the locking component to a cutter locking position, the restraining member is driven by the locking component to move to a position away from the locking component to ensure that the locking component moves smoothly to the cutter locking position; and in this process, the restoring member is elastically deformed to store elastic potential energy, and when the locking component moves to the cutter locking position, the restraining member is no longer limited by the locking component, and is automatically restored under restore elastic force of the restoring member, and locking the locking component in the cutter locking position;
   when the locking component moves from cutter locking position to cutter removing position, the restraining member is moved against the elastic force of the restoring member, the locking of the locking component is released to ensure that the locking component smoothly moves to the cutter removing position;
   wherein the locking and matching mechanism comprises an elastic member matching with the locking component, elastically deforming during a movement of the locking component relative to the base, and providing at least a part of a driving force to urge the locking component to the cutter removing position during restore deformation.

2. The cutter set mounting structure according to claim 1, wherein
the locking component is rotatably connected to the base, a locking groove is provided on the locking component, a locking protrusion is provided on a wall surface of the cutter holder, and the locking protrusion is adapted to be plug-fitted with the locking groove.

3. The cutter set mounting structure according to claim 2, wherein
the locking component is provided with a locking portion comprising a fixing part and an elastic part adapted to be elastically deformed, the fixing part and the elastic part enclose to form the locking groove, one end of the elastic part is fixedly connected to one end of the fixed part, and another end of the elastic part and another end of the fixing part form an insertion part for a insertion of the locking protrusion,
wherein the anti-disengagement part comprises a locking protrusion, the anti-disengagement matching part comprises a locking portion, and a minimum width of a distance between another end of the elastic part and another end of the fixing part in a natural state is less than a width of the locking protrusion.

4. The cutter set mounting structure according to claim 3, wherein
a width of the locking protrusion ranges from 2 mm to 10 mm.

5. The cutter set mounting structure according to claim 3, wherein
the fixing part and the elastic part are both strip-shaped structures, two ends of the fixing part are fixedly connected to the locking component, one end of the elastic part is fixedly connected to the fixing part, another end of the elastic part is formed as a free end, and an avoidance gap is formed between the elastic part and the locking component.

6. The cutter set mounting structure according to claim 1, wherein
one of the anti-disengagement part and the anti-disengagement matching part comprises an elastic member adapted to be elastically deformed, and another comprises a clamping groove, the elastic member is adapted to be engaged in or disengaged from the clamping groove.

7. The cutter set mounting structure according to claim 6, wherein
the elastic member is provided on a hole wall of the mounting hole.

8. The cutter set mounting structure according to claim 1, wherein
a plurality of number of the anti-disengagement parts is arranged, and the number of the anti-disengagement matching parts is equal to and corresponds to the number of the anti-disengagement matching parts one-to-one,
wherein at least a portion of the anti-disengagement parts are spaced apart along a circumferential direction of the mounting hole; and/or
at least a portion of the anti-disengagement parts are spaced apart along an axial direction of the mounting hole.

9. The cutter set mounting structure according to claim 1, wherein the cutter holder comprises:
a plug-in post comprising a connecting upper part and a connecting lower part connected to a lower end of the connecting upper part, the connecting upper part and the connecting lower part both being configured to be plug-fitted with the mounting hole,
wherein an outer periphery of the connecting upper part protrudes from an outer periphery of the connecting lower part.

10. The cutter set mounting structure according to claim 1, wherein
the locking component is movably connected to the base, and the elastic member comprises a torsion spring, wherein the torsion spring comprises a first torsion arm and a second torsion arm, and the first torsion arm is limited or abutted on the locking component, and the second torsion arm is limited or abutted on the base.

11. The cutter set mounting structure according to claim 1, wherein
the elastic member is configured to drive the locking component to move to the cutter removing position and position the locking component at the cutter removing position using a restore elastic force thereof after the restraining mechanism of the cutter set mounting structure releases the locking of the locking component.

12. A stirring cup for a food processor, comprising:
a cup body adapted to receive a cutter; and
the cutter set mounting structure according to claim 1, wherein a container bottom of the cutter set mounting structure is connected to a lower end of the cup body, and the cutter is mounted on and rotatably connected to a cutter holder of the cutter set mounting structure.

13. A food processor, comprising:
a stirring cup; and
a machine base located below the stirring cup and configured to be connected to the stirring cup; wherein
the stirring cup comprises a cup body adapted to receive a cutter and a cutter set mounting structure;
the cutter set mounting structure comprises a container bottom provided with a mounting hole, a restraining mechanism, a cutter holder mounted at the mounting hole for mounting a cutter of the food processor
the container bottom is connected to a lower end of the cup body, and the cutter is rotatably connected to the cutter holder;
the cutter holder is provided with an anti-disengagement part, the container bottom is provided with an anti-disengagement matching part, and the anti-disengagement matching part matches with the anti-disengagement part to limit the cutter holder from falling out of the mounting hole under gravitational force; and
the container bottom comprises: a base and a locking component; the base is provided with the mounting hole; the locking component is mounted on the base, matches with the cutter holder, and is adapted to reciprocate relative to the base between a cutter removing position and a cutter locking position, and locks the cutter holder to fix the cutter holder when moving to the cutter locking position, and unlocks the cutter holder when moving to the cutter removing position; wherein the base and/or the locking component are provided with the anti-disengagement matching part, and a locking and matching mechanism provided on the base and matches with the locking component for positioning the locking component in the cutter removing position to limit a movement of the locking component relative to the container bottom;

wherein
the restraining mechanism is provided on the base and matches with the locking component for locking the locking component in the cutter locking position to limit a movement of the locking component to the cutter removing position;
the restraining mechanism comprises a restraining member provided on the base and adapted to reciprocate relative to the base to lock the locking component in the cutter locking position or unlock a locking of the locking component, and a restoring member matched with the restraining member and configured for driving the restraining member to restore previous position;
during movement of the locking component to a cutter locking position, the restraining member is driven by the locking component to move to a position away from the locking component to ensure that the locking component moves smoothly to the cutter locking position; and in this process, the restoring member is elastically deformed to store elastic potential energy, and when the locking component moves to the cutter locking position, the restraining member is no longer limited by the locking component, and is automatically restored under restore elastic force of the restoring member, and locking the locking component in the cutter locking position;
when the locking component moves from cutter locking position to cutter removing position, the restraining member is moved against the elastic force of the restoring member, the locking of the locking component is released to ensure that the locking component smoothly moves to the cutter removing position; and
the locking and matching mechanism comprises an elastic member matching with the locking component, elastically deforming during a movement of the locking component relative to the base, and providing at least a part of a driving force to urge the locking component to the cutter removing position during restore deformation.

14. The food processor according to claim 13, wherein
the locking component is movably connected to the base, the elastic member comprises a torsion spring, the torsion spring comprises a first torsion arm and a second torsion arm, the first torsion arm is limited or abuts on the locking component, and the second torsion arm is limited or abuts on the base;
the elastic member is configured to drive the locking component to move to the cutter removing position and positioning the locking component at the cutter removing position using a restore elastic force thereof after the restraining mechanism of the cutter set mounting structure releases the locking of the locking component;
the locking component is rotatably connected to the base, a locking groove is provided on the locking component, a locking protrusion is provided on a wall surface of the cutter holder, and the locking protrusion is adapted to be plug-fitted with the locking groove;
a width of the locking protrusion ranges from 2 mm to 10 mm;
the locking component is provided with a locking portion comprising a fixing part and an elastic part adapted to be elastically deformed, the fixing part and the elastic part enclose to form the locking groove, one end of the elastic part is fixedly connected to one end of the fixed part, and another end of the elastic part and another end of the fixing part form an insertion part for an insertion of the locking protrusion;
the fixing part and the elastic part are both strip-shaped structures, two ends of the fixing part are fixedly connected to the locking component, one end of the elastic part is fixedly connected to the fixing part, another end of the elastic part is formed as a free end, and an avoidance gap is formed between the elastic part and the locking component; and
the anti-disengagement part comprises the locking protrusion, the anti-disengagement matching part comprises the locking portion, and a minimum width of a distance between another end of the elastic part and another end of the fixing part in a natural state is less than a width of the locking protrusion; or one of the anti-disengagement part and the anti-disengagement matching part comprises an elastic member adapted to be elastically deformed, and another comprises a clamping groove, the elastic member is adapted to be engaged in or disengaged from the clamping groove, the elastic member being provided on a hole wall of the mounting hole.

\* \* \* \* \*